(12) United States Patent
Masuda

(10) Patent No.: US 11,802,826 B2
(45) Date of Patent: Oct. 31, 2023

(54) MEASUREMENT APPARATUS

(71) Applicant: KYOCERA Corporation, Kyoto (JP)

(72) Inventor: Yuji Masuda, Yasu (JP)

(73) Assignee: KYOCERA Corporation, Kyoto (JP)

(*) Notice: Subject to any disclaimer, the term of this patent is extended or adjusted under 35 U.S.C. 154(b) by 395 days.

(21) Appl. No.: 17/286,528

(22) PCT Filed: Oct. 23, 2019

(86) PCT No.: PCT/JP2019/041522
§ 371 (c)(1),
(2) Date: Apr. 19, 2021

(87) PCT Pub. No.: WO2020/090582
PCT Pub. Date: May 7, 2020

(65) Prior Publication Data
US 2022/0018751 A1    Jan. 20, 2022

(30) Foreign Application Priority Data

Oct. 29, 2018  (JP) ................................. 2018-202597

(51) Int. Cl.
*G01N 15/06*  (2006.01)
(52) U.S. Cl.
CPC ..... *G01N 15/06* (2013.01); *G01N 2015/0687* (2013.01); *G01N 2015/0693* (2013.01)
(58) Field of Classification Search
CPC ... G01N 2015/0687; G01N 2015/0693; G01N 15/06; G01N 35/00069; G01N 2035/00158; G01N 2015/0065
See application file for complete search history.

(56) References Cited

U.S. PATENT DOCUMENTS 4,063,097 A * 12/1977 Barrett .................. G06T 11/003
378/18
4,234,539 A * 11/1980 Ginsberg ............. G01N 21/253
250/226

(Continued)

FOREIGN PATENT DOCUMENTS

JP    2001-074724 A    3/2001
JP    2008-209353 A    9/2008

(Continued)

*Primary Examiner* — Dominic J Bologna
*Assistant Examiner* — Jarreas C Underwood
(74) *Attorney, Agent, or Firm* — Volpe Koenig

(57) ABSTRACT

A measurement apparatus includes: a flow path device including a first flow path in which first liquid including particles to be measured is flowed, and which includes a measurement region measured with an optical sensor, a second flow path in which second liquid for comparison is flowed, and which includes a comparison region measured with the optical sensor, and a calibration region for calibrating the optical sensor; an arm-like member in which the optical sensor is disposed in a first end, and in which a drive shaft is disposed in a second end; and a rotary drive actuator configured to rotationally drive the arm-like member in a predetermined range, wherein each of the measurement region, the comparison region, and the calibration region is disposed as a region including a position on a circumference along which the optical sensor moves in accordance with a rotary drive of the arm-like member.

5 Claims, 15 Drawing Sheets

(56) References Cited

U.S. PATENT DOCUMENTS

| | | | | |
|---|---|---|---|---|
| 8,696,990 B2* | 4/2014 | Meller | ................ | G01N 21/253 |
| | | | | 422/50 |
| 2006/0121602 A1* | 6/2006 | Hoshizaki | ............. | F21V 29/763 |
| | | | | 422/63 |
| 2007/0155017 A1* | 7/2007 | Wyatt | ................ | G01N 15/0255 |
| | | | | 436/45 |
| 2009/0079968 A1* | 3/2009 | Tokieda | ............. | G01N 21/0303 |
| | | | | 356/130 |
| 2019/0323939 A1* | 10/2019 | Masuda | ................ | G01N 21/59 |

FOREIGN PATENT DOCUMENTS

| | | | |
|---|---|---|---|
| JP | 2008209353 A * | 9/2008 | |
| JP | 2012/118046 A | 6/2012 | |
| JP | 2015-031676 A | 2/2015 | |
| WO | 2009/145022 A1 | 12/2009 | |
| WO | 2016/132222 A2 | 8/2016 | |
| WO | 2017/221986 A1 | 12/2017 | |
| WO | WO-2019204841 A1 * | 10/2019 | ............ B01L 3/0289 |

* cited by examiner

MEASUREMENT APPARATUS

CROSS-REFERENCE TO RELATED APPLICATION

The present application is a National Phase entry based on PCT Application No. PCT/JP2019/041522 filed on Oct. 23, 2019, entitled "MEASURING DEVICE", which claims the benefit of Japanese Patent Application No. 2018-202597, filed on Oct. 29, 2018, entitled "MEASURING DEVICE". The contents of which are incorporated by reference herein in their entirety.

FIELD

Embodiments of the present disclosure relates generally to a measurement apparatus flowing each of liquid including particles to be measured and liquid for comparison in a flow path to measure it with an optical sensor.

BACKGROUND

Known is that liquid including particles to be measured, such as blood including white blood cell (leucocyte), for example, and liquid for comparison which does not include the particles, such as a saline solution for calibration, for example, are supplied to a reaction device or a microchip including a so-called micro flow path to perform various measurements on the liquid including the particles to be measured. Also known as a measurement of the particles is that an optical sensor including a light emitting element and a light receiving element is used to measure a concentration and the like of particles to be measured.

SUMMARY

A measurement apparatus is disclosed. In one embodiment, a measurement apparatus includes: a flow path device including a first flow path in which first liquid including particles to be measured is flowed, and which includes a measurement region where the particles in the first liquid are measured with an optical sensor, a second flow path in which second liquid for comparison which does not include the particles is flowed, and which includes a comparison region where the second liquid is measured with the optical sensor, a calibration region for calibrating the optical sensor, and a non-reflection member disposed on a side of the flow path device that is opposite to the optical sensor, and that corresponds to the measurement region and the comparison region; an arm-like member in which the optical sensor including a light emitting element and a light receiving element is disposed in a first end, and in which a drive shaft is disposed in a second end; and a rotary drive actuator connected to the drive shaft and configured to rotationally drive the arm-like member in a predetermined range, wherein each of the measurement region, the comparison region, and the calibration region is disposed as a region including a position on a circumference along which the optical sensor moves in accordance with a rotary drive of the arm-like member.

BRIEF DESCRIPTION OF THE DRAWINGS

FIG. 1A illustrates a top view and FIG. 1B illustrates a side view.

FIG. 2A illustrates a top view and FIG. 2B illustrates a side view.

FIG. 9A illustrates a cross-sectional view and FIG. 9B illustrates a drawing for describing a mechanism of a measurement.

DETAILED DESCRIPTION

Figure 1A:
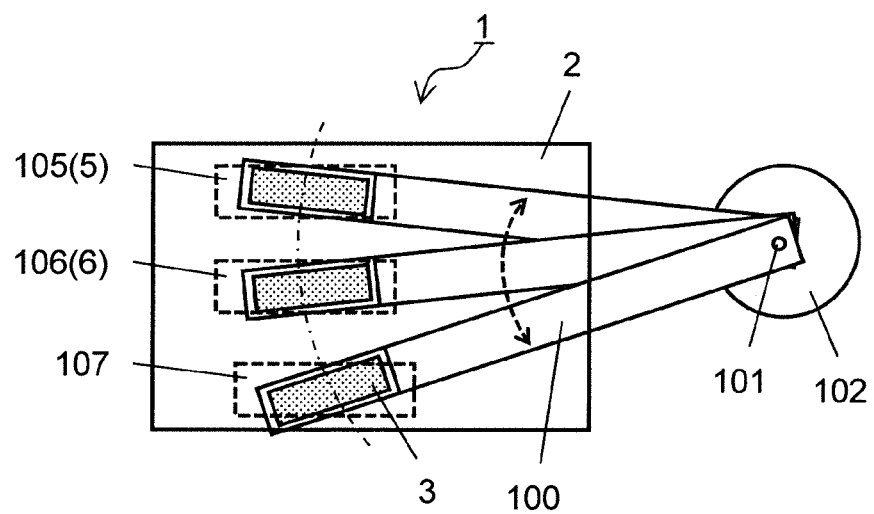
FIGS. 1A and 1B illustrate an example of an embodiment of a measurement apparatus according to the present disclosure.

Each liquid is flowed in a flow path such as a micro flow path and measured in a predetermined region of the flow path to measure the liquid including the particles to be measured and the liquid for comparison with the optical sensor. At that time, the optical sensors are disposed on the both flow paths to measure the two types of liquid at the same time, or the two types of liquid are sequentially measured with one optical sensor.

However, when the plurality of optical sensor are used and disposed on the flow paths, respectively, there is a tendency that the measurement apparatus is hardly downsized, and a variation of characteristics between the optical sensors or a deterioration thereof is hardly corrected to achieve an accurate measurement. In the meanwhile, when one optical sensor is used for predetermined regions of the both flow paths and moved to sequentially perform the measurement, an influence of the variation of characteristics between the optical sensors or the deterioration thereof is reduced, however, there is a tendency that a movement mechanism hardly corresponds to each region and is hardly moved rapidly and accurately while downsizing the movement mechanism.

Thus, required is a practical means capable of performing an accurate and stable measurement using an optical sensor on a flow path device which includes a flow path including a measurement region and a flow path including a comparison region.

According to a measurement apparatus of the present disclosure, an arm-like member in which an optical sensor including a light emitting element and a light receiving element is disposed on a first end and a drive shaft to which a rotary drive actuator is connected is disposed on a second end is used, in a flow path device which includes a first flow path in which first liquid including particles to be measured is flowed and including a measurement region, and a second flow path in which second liquid for comparison which does not include the particles is flowed and including a comparison region, the measurement region and the comparison region are disposed in a position on a circumference along which the optical sensor moves in accordance with a rotary drive of the arm-like member, thus an accurate and stable measurement can be performed while downsizing the measurement apparatus. In the flow path device, a calibration region is disposed in a position on a circumference along which the optical sensor moves, thus the optical sensor can be calibrated as necessary in the measurement. Accordingly, an influence of a variation of characteristics of the optical sensor or a deterioration thereof is reduced, and an accurate and stable measurement can be performed.

Hereinafter, examples of an embodiment of a measurement apparatus according to the present disclosure and an example of a flow path device in the measurement apparatus are described with reference to the drawings. In the present disclosure, a rectangular coordinate system (X, Y, Z) is defined for descriptive purposes to define a positive side in a Z axis direction as an upper side, however, in the present disclosure, any direction may be the upper side or a lower side. The following contents exemplifies embodiments of the present disclosure, and the present disclosure is not limited to these embodiments. It is obvious that various modifications are applicable within a scope of the present disclosure.

Figure 1B:
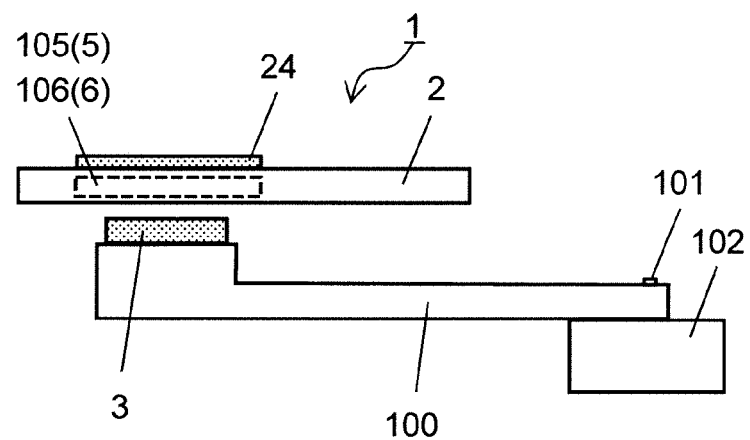

FIGS. 1A and 1B illustrate an example of an embodiment of a measurement apparatus according to the present disclosure, and FIG. 1A illustrates a top view and FIG. 1B illustrates a side view. In FIG. 1A, the measurement apparatus is partially illustrated in a perspective view and the other part is illustrated in an overlapped manner for describing an operation.

A measurement apparatus 1 in the present example is for supplying first liquid for inspection and second liquid for comparison to a first flow inlet and a second flow inlet of an inspection device (not shown), respectively. The measurement apparatus 1 includes a flow path device 2 including a first flow path 5 in which first liquid including particles to be measured is flowed and including a measurement region 105 where the particles in the first liquid are measured with an optical sensor 3, a second flow path 6 in which second liquid for comparison which does not include the particles is flowed and including a comparison region 106 where the second liquid is measured with the optical sensor 3, and a calibration region 107 for calibrating the optical sensor 3. The measurement apparatus 1 includes an arm-like member 100 in which the optical sensor 3 including a light emitting element and a light receiving element is disposed in a first end (a left end in FIGS. 1A and 1B) and a drive shaft 101 is disposed in a second end (a right end in FIGS. 1A and 1B). The measurement apparatus 1 includes a rotary drive actuator 102 connected to the drive shaft 101 and configured to rotationally drive the arm-like member 100 in a predetermined range. Each of the measurement region 105, the comparison region 106, and the calibration region 107 in the flow path device 2 is disposed as a region including a position on a circumference along which the optical sensor 3 moves in accordance with a rotary drive of the arm-like member 100 (visually illustrated by an alternate long and short dash line in FIG. 1A).

The positions of the measurement region 105 (the first flow path 5) and the comparison region 106 (the second flow path 6) located inside the flow path device 2 and the calibration region 107 (the illustration is omitted in FIG. 1B) are illustrated by dashed lines in FIGS. 1A and 1B. In FIG. 1A, the optical sensor 3 and the arm-like member 100 are seen through the flow path device 2, and the optical sensor 3 facing each of the regions 105, 106, and 107 is illustrated to be located in three positions in an overlapped manner, and a movement thereof is indicated by an arc with a double-headed arrow on both ends of a dashed line.

According to such a measurement apparatus 1 of the present example, the arm-like member 100 in which the rotary drive actuator 102 is connected to the drive shaft 101 rotationally drives the optical sensor 3 in the predetermined range (a range of a circumference around the drive shaft 101 as a rotation center), and the measurement region 105 and the comparison region 106 are disposed as the regions each including a position on a circumference along which the optical sensor 3 moves in accordance with the rotary drive of the arm-like member 100, thus the measurement in the measurement region 105 and the comparison measurement in the comparison region 106 can be sequentially performed with a slight movement of the arm-like member 100. Accordingly, the measurement can be performed simply and accurately, and a drive mechanism of the optical sensor 3 is not extensive, thus the measurement apparatus 1 can be downsized. The calibration region 107 used for calibrating the optical sensor 3 is also disposed as a region including the position on a circumference along which the optical sensor 3 moves in the similar manner, thus characteristics of the optical sensor 3 can be calibrated using the calibration region 107 as a zero point in the measurement for each measurement, thus an influence by a fluctuation of the characteristics of the optical sensor 3 can be reduced and the measurement can be performed stably and accurately. The measurement in the measurement region 105, the comparison measurement in the comparison region 106, and the calibration in the calibration region 107 can be performed by the optical sensor 3 in a desired order easily.

The measurement apparatus 1 of the present disclosure handles cells such as white blood cells as particles to be measured in the first liquid, for example, using blood as the first liquid, for example, thereby being able to optically measure a concentration of the particles by the optical sensor 3, and functions as a particle concentration measurement apparatus. When blood is used as the first liquid, a saline solution (phosphate buffered salts: PBS), for example, can be used as the second liquid which does not include particles. The measurement apparatus 1 can also be applied to particles made up of various inorganic materials or organic materials as the particles to be measured, and the first liquid and the second liquid which are appropriate media can be used for the particles. Accordingly, the measurement apparatus 1 of the present disclosure functions as the particle concentration measurement apparatus capable of optically measuring a concentration of the various particles in the first liquid.

The configuration in the example of the flow path device 2 is described in detail hereinafter, and as a basic configuration, the first liquid and the second liquid are supplied from a side of an upper surface of the flow path device 2, and the liquid after the measurement is discharged from a side of a lower surface of the flow path device 2 and recovered or discarded. Accordingly, the optical sensor 3 is disposed on the side of the lower surface of the flow path device 2. However, the first liquid and the second liquid can be supplied and discharged from any side of the upper surface and the lower surface of the flow path device 2, thus the optical sensor 3 may be disposed on the side of the upper surface of the flow path device 2 in accordance with the configuration of the flow path device 2.

In the flow path device 2, the first liquid and the second liquid are optically measured in the measurement region 105 and the comparison region 106, thus at least these regions are translucent, however, the other part may be translucent or non-translucent.

The calibration region 107 needs not necessarily be disposed integrally with a substrate of the flow path device 2 including the measurement region 105 and the comparison region 106. For example, it is also applicable that a part of a stage (not shown) for setting the flow path device 2 in the measurement serves as a member integrally constituting the flow path device 2 by being set, the calibration region 107 is disposed on the member constituting the flow path device 2. According to this configuration, the optical sensor 3 can be calibrated on the same basis by the same calibration region 107 even in a case where the plurality of flow path devices 2 are replaced in accordance with a replacement of the plurality types of first liquid, thus this configuration is advantageous in performing the accurate and stable measurement. The calibration region 107 functions as a reference (zero point) of the optical measurement, thus when the calibration region 107 is disposed integrally with the substrate of the flow path device 2, the calibration region 107 can always function as a new reference in the case where the plurality of the flow path devices 2 are replaced, and when characteristics of an object to be measured is changed, for example, characteristics of the calibration region 107 can be set as the reference in accordance with the characteristics of the object, thus various type of measurement can be handled.

The optical sensor 3 includes the light emitting element and the light receiving element, and irradiates the measurement region 105 including the first liquid, the comparison region 106 including the second liquid, and the calibration region 107 with light emitted from the light emitting element and receives reflected light reflected by each region with the light receiving element, thereby detecting output current of the reflected light to be able to optically measure the object.

The arm-like member 100 is rotationally driven by the rotary drive actuator 102, and circumferentially moves the optical sensor 3 around the drive shaft 101. A shape and a size of the arm-like member 100 may be appropriately set so that a desired strength and accuracy can be secured in the movement of the optical sensor 3 and in accordance with the configuration of the flow path device 2. Various materials such as various types of resin, metal, glass, and ceramic can be selected as a material of the arm-like member 100 as long as a desired strength, accuracy, and durability can be secured. Applicable is not only the arm-like member 100 made up of one member as a whole but also the arm-like member 100 made up of components of each unit appropriately combined with each other.

The drive shaft 101 is connected to a rotary drive shaft of the rotary drive actuator 102 and the second end of the arm-like member 100 to function as a center point around which the arm-like member 100 rotationally drives at a desired rotational angle and speed.

Various drive means can be used as the rotary drive actuator 102 as long as the drive means can rotationally drive the arm-like member 100 at a predetermined position accurately. For example, there is no particular limitation as long as the drive means can rotationally drive the arm-like member 100 in the present disclosure such as various types of motor such as a pulse motor (also referred to as a stepping motor) and a servo motor connected directly to the drive shaft 101 or connected to the drive shaft 101 via a gear mechanism and a syringe (piston), a piezo actuator, or a linear motor provided with a slider crank mechanism or a gear mechanism such as a rack and pinion converting a linear movement into a rotational movement.

Particularly, it is preferable to use a pulse motor for the rotary drive actuator 102. A rotary movement by the pulse motor is preferable as a drive means of moving the optical sensor 3 in the present disclosure by reason that it is easily controlled, a rotary drive can be performed by a high torque at a low speed, and a favorable position accuracy is achieved. It is important to position the optical sensor 3 in each region and hold it at that position in a stationary state to perform the optical measurement, and the pulse motor is preferable also in such characteristics.

Although the illustration is omitted, the measurement apparatus 1 of present disclosure also includes a power source unit supplying an electrical power to the light emitting element in the optical sensor 3 to emit light, a processor to which output current is input from the light receiving element to perform predetermined arithmetic processing, and a controller including a drive controller and the like for making the rotary drive actuator 102 perform a desired rotary drive. Known various circuits or devices can be applied to these units.

In the measurement apparatus 1 of the present disclosure, as illustrated in FIG. 1B, the flow path device 2 preferably includes a reflection member 24 or a non-reflection member 24 disposed on a side opposite to the optical sensor 3, on the side of the upper side in the present example to correspond to the measurement region 105 and the comparison region 106. The reflection member 24 can reflect part of light emitted from the light emitting element in the optical sensor 3 that has passed through each of the first flow path 5 in the measurement region 105 and the second flow path 6 in the comparison region 106 to the light receiving element in the optical sensor 3. When the light passing through the first flow path 5 in the measurement region 105 and the second flow path 6 in the comparison region 106 includes a large amount of DC offset component in the measurement of a light loss, the non-reflection member 24 can block the reflection of the light and block disturbance light from entering the measurement apparatus 1.

Figure 2A:
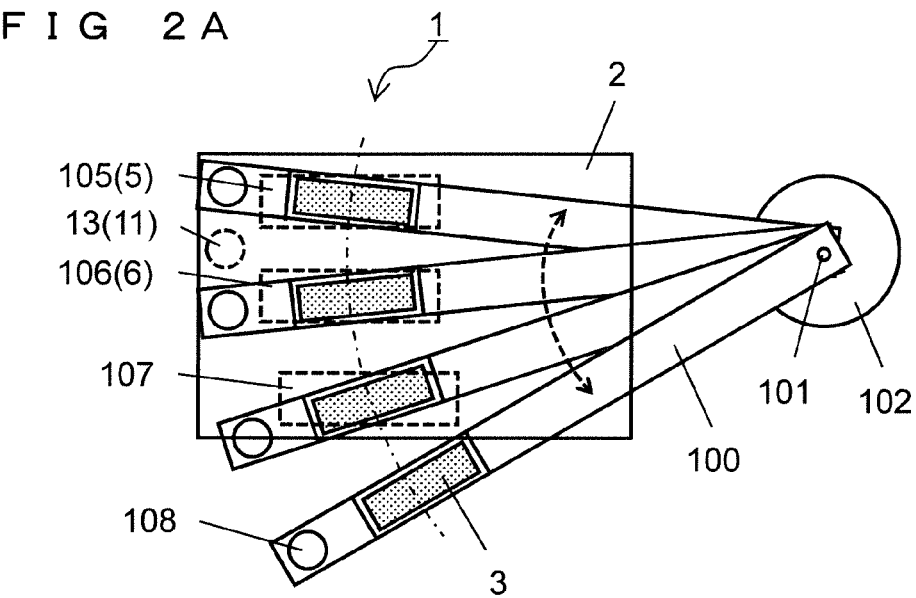
FIGS. 2A and 2B illustrate another example of an embodiment of a measurement apparatus according to the present disclosure.
Figure 2B:
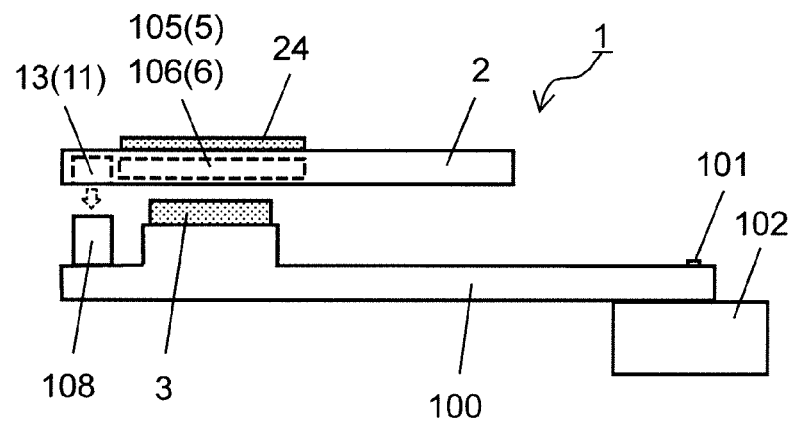

Next, FIGS. 2A and 2B illustrate another example of an embodiment of the measurement apparatus according to the present disclosure, and FIG. 2A illustrates a top view and FIG. 2B illustrates a side view. Also in FIG. 2B, in the manner similar to FIG. 1B, the elements are seen through a part of the elements (the flow path device 2), and the other part (the arm-like member 100, for example) is illustrated in an overlapped manner to describe an operation.

In the measurement apparatus 1 of the present example, the flow path device 2 includes a first flow outlet 13 to which the first flow path 5 is connected and through which the first liquid flows out in a movable range of the arm-like member 100, and the arm-like member 100 includes a first liquid recovery container 108 disposed to correspond to the first flow outlet 13 and configured to recover the first liquid flowed out through the first flow outlet 13. According to this configuration, the first liquid which has been measured in the measurement region 105 of the first flow path 5 is flowed out through the first flow outlet 13 and then recovered in the first liquid recovery container 108 located to correspond to the first flow outlet 13, and subsequently, the arm-like member 100 is rotationally moved to outside the flow path device 2 or outside the stage on which the flow path device 2 is disposed, thus the first liquid recovery container 108 can be replaced easily to recover or discard the first liquid.

In the first liquid recovery container 108 in the measurement apparatus 1 of the present example, a first end of the arm-like member 100 is extended compared with the example illustrated in FIGS. 1A and 1B, and the first liquid recovery container 108 is disposed in an extended part so as to be located closer to a side of the first end in relation to the optical sensor 3. This case has an advantage that a distance of a rotational movement of the arm-like member 100 can be reduced at the time of moving the first liquid recovery container 108 outside the flow path device 2 to recover or discard the first liquid.

It is sufficient that the position of the first liquid recovery container 108 disposed on the arm-like member 100 is set to match the position of the first flow outlet 13 in the flow path device 2 and so as not to prevent the recovery outside the flow path device 2, thus the first liquid recovery container 108 may be disposed closer to the side of the first end or the second end in relation to the optical sensor 3 in the arm-like member 100.

The first flow outlet 13 is formed as a first opening 11 located in the upper surface or the lower surface of the flow path device 2 as described hereinafter. The first liquid flowed out through the first flow outlet 13 needs not be necessarily recovered by the first liquid recovery container 108. For example, it is also applicable that the first flow outlet 13 is disposed out of the movable range of the arm-like member 100, and the first liquid can be recovered independently of the movement of the arm-like member 100 by a recovery container which is separately disposed, a tube connected for recovery, or the like. The first flow outlet 13 is preferably disposed on the lower surface of the flow path device 2 to recover the first liquid using gravity, however, it is also applicable that the first flow outlet 13 is disposed on the upper surface of the flow path device 2 and a recovery container or a tube, for example, is connected to absorb or suck the first liquid forced out and flowed out of the first flow path 5 and recover the first liquid.

Figure 3:
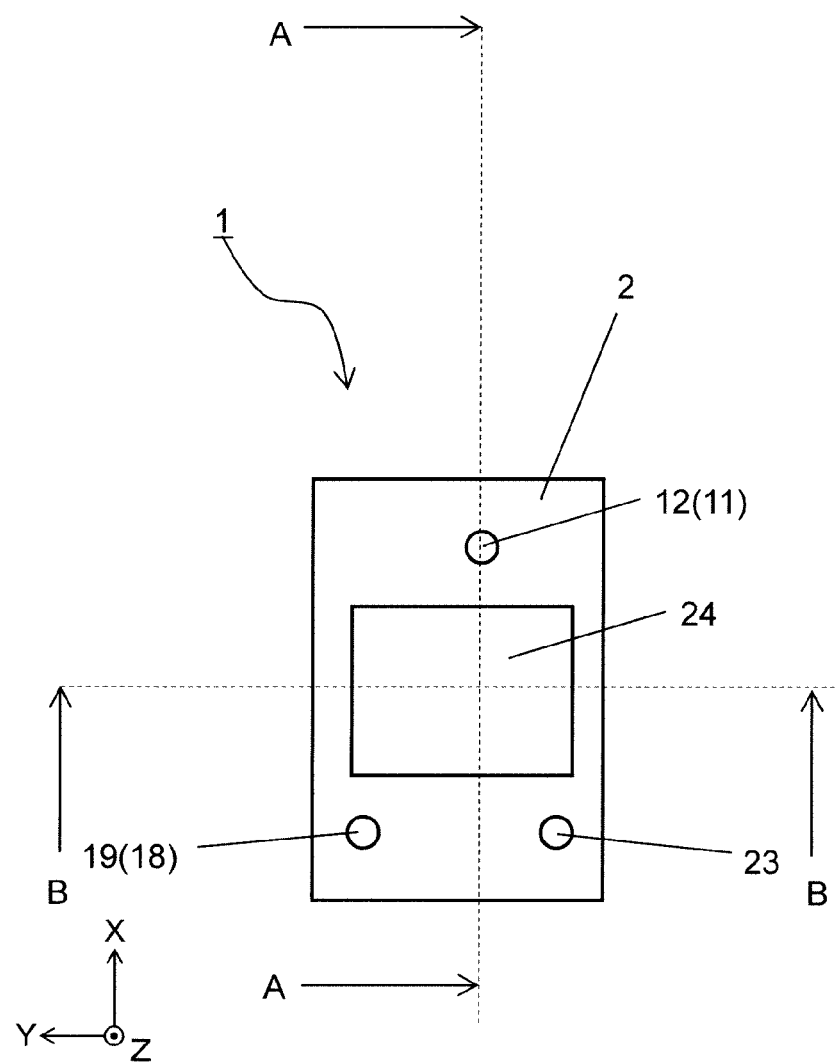
FIG. 3 illustrates a top view showing a part of another example of the measurement apparatus according to the present disclosure.
Figure 4:
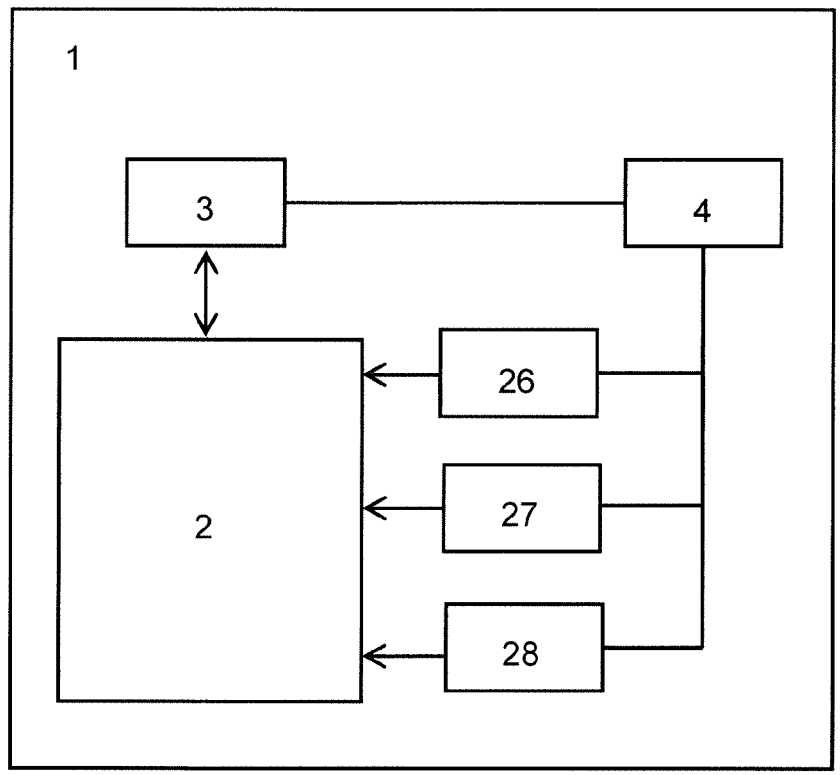
FIG. 4 illustrates a block diagram schematically showing a part of a configuration of another example of the measurement apparatus according to the present disclosure.
Figure 5:
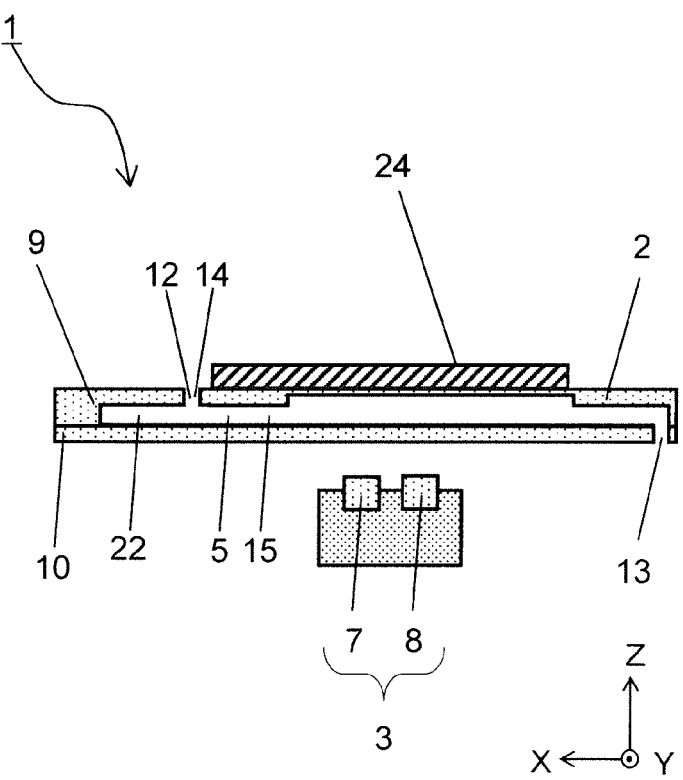
FIG. 5 illustrates a cross-sectional view showing a part of another example of the measurement apparatus according to the present disclosure.

Next, FIGS. 3 to 5 illustrate a part of another example of the measurement apparatus according to the present disclosure. FIG. 3 illustrates a top view of the measurement apparatus 1. FIG. 4 illustrates a block diagram schematically showing the configuration of the measurement apparatus 1. FIG. 5 illustrates a cross-sectional view of the measurement apparatus 1, and illustrates a cross-sectional view of the measurement apparatus 1 cut along an A-A line illustrated in FIG. 3. In these drawings, the illustration of the mechanism rotationally driving the optical sensor 3 is omitted.

The measurement apparatus 1 can measure specific particles in liquid as a target. The measurement apparatus 1 includes the flow path device 2, the optical sensor 3, and a controller 4. The illustration of the mechanism rotationally driving the optical sensor 3 is omitted. Liquid (the first liquid such as blood, for example) including specific particles (particles such as white blood cells, for example) and liquid (the second liquid such as PBS, for example) which does not include the particles flow in the flow path device 2. The optical sensor 3 is disposed to face the measurement region and the comparison region of the predetermined flow path in the flow path device 2, thus can irradiate the first liquid with light and receive light passing through the first liquid (light reflected after passing through the first liquid, and then passing through the first liquid again and returning). The controller 4 can estimate and measure the number of particles, for example, based on an output of the optical sensor 3. The first liquid is liquid including particles to be measured, and is a sample when it is an inspection target by the measurement.

When the first liquid is irradiated with light from the optical sensor 3, the light passing through the first liquid is reflected, scattered, or absorbed by the particles, and intensity of the light decreases. A standard curve indicating a relationship between a sample including particles, the number of which is already known, and an attenuation amount of the light is previously prepared, and the light intensity and the standard curve are compared by the controller 4, thus a concentration of the particles can be measured.

Figure 6:
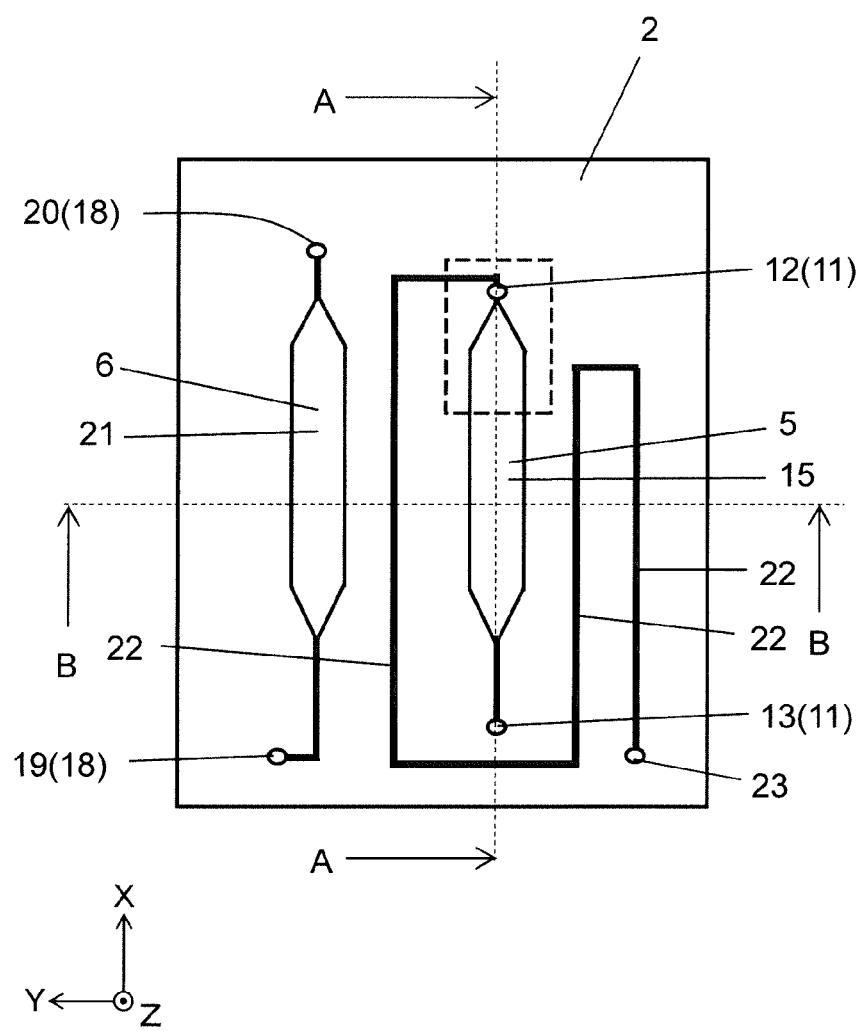
FIG. 6 illustrates a top view showing an example of a flow path device in the measurement apparatus according to the present disclosure.

FIG. 6 schematically illustrates an example of the flow path device 2. FIG. 6 illustrates a top view of the flow path device 2 when seen from an upper surface transparently. An A-A line in FIG. 6 corresponds to the A-A line in FIG. 3.

The flow path device 2 is a measurement flow path for measuring the particles in the first liquid. The flow path device 2 includes the first flow path 5 and the second flow path 6 both having translucency. The first liquid including the particles to be measured flows in the first flow path 5. The second liquid for comparison which does not include particles flows in the second flow path 6. The first flow path 5 is a flow path for measurement, and the second flow path 6 is a flow path for comparison measurement. The first liquid is a sample in an inspection, and is assumed as blood, for example. The second liquid is liquid for comparison, and PBS, for example, can be used.

The optical sensor 3 can sense the particles in the first liquid. The optical sensor 3 irradiates each of the first flow path 5 and the second flow path 6 with light, and receives the light passing through each of the first flow path 5 and the second flow path 6 in the measurement. The optical sensor 3 includes a light emitting element 7 and a light receiving element 8. The light emitting element 7 may be a light emitting diode (LED) or a laser diode (LD), for example, and the light emitting element 7 in the present example is an LED. The light receiving element 8 may be a photo diode (PD), for example.

The controller 4 controls the measurement apparatus 1. The controller 4 compares intensity of the light (first light) passing through the first flow path 5 and intensity of the light (second light) passing through the second flow path 6, each of which is obtained by the optical sensor 3, thereby being able to measure the particles in the first liquid. That is to say, the controller 4 calculates a difference of intensity between the first light and the second light, and compares the difference of intensity between the first light and the second light with the standard curve, thereby being able to measure the particles.

Herein, when a conventional measurement apparatus is used repeatedly, a light emitting element of an optical sensor is deteriorated, and the light intensity is gradually reduced. That is to say, in the case where the particles are measured in accordance with a change of the light intensity using a diffusion, absorption and the like of the light of the particles with the optical sensor, when the light intensity is reduced due to the deterioration of an optical element, for example, a measurement result that the number of particles is larger than an original number is erroneously obtained. In the meanwhile, in the measurement apparatus 1 according to the present disclosure, the particles are measured in accordance with the difference of intensity between the first light and the second light, as described above, thus a measurement accuracy can be maintained or improved regardless of the deterioration of the optical element.

The flow path device 2 functions as the flow paths for measurement and comparison as described above. In the flow path device 2, at least the measurement region in the first flow path 5 and the comparison region in the second flow path 6 have translucency to measure the particles in the first liquid with the optical sensor 3.

The flow path device 2 has a plate-like shape, for example. The flow path device 2 in the present example is formed by mainly bonding a first substrate 9 and a second substrate 10. Specifically, the flow path device 2 includes the first substrate 9 with a groove and the second substrate 10 disposed on a surface of the first substrate 9. The second substrate 10 covers an opening of the groove in the first substrate 9. That is to say, the groove of the first substrate 9 and the surface of the second substrate 10 constitute the first flow path 5 and the second flow path 6. The flow path device 2 may include a member other than the first substrate 9 and the second substrate 10.

The first substrate 9 is a flat plate-like member, for example. A material of the first substrate 9 may be, for example, glass, an acrylic resin, a polycarbonate resin, a cyclic olefin copolymer (COC) resin, a cycloolefin polymer (COP) resin, polydimethylsiloxane (PDMS) resin, or the like. The material of the first substrate 9 in the present example is PDMS. A refraction index of the first substrate 9 is set to equal to or larger than 1.4 and equal to or smaller than 1.6, for example.

A width of the groove of the first substrate 9 may be 500 μm to 4000 μm (0.5 mm to 4 mm), for example. A depth of the groove may be 100 μm to 1000 μm (0.1 mm to 1 mm), for example. The first substrate 9 and the groove of the first substrate 9 can be formed by a conventionally known method. A thickness of the first substrate 9 from a bottom surface of the groove is set to equal to or larger than 0.5 mm and equal to or smaller than 1 mm, for example. In the flow path device 2 in the present example, the width and depth of the groove of the first substrate 9 is the same as those of the first flow path 5 and the second flow path 6.

The second substrate 10 is a flat plate-like member, for example. A material of the second substrate 10 may be, for example, glass, an acrylic resin, a polycarbonate resin, polydimethylsiloxane (PDMS) resin, or the like. A refraction index of the second substrate 10 is set to equal to or larger than 1.4 and equal to or smaller than 1.6, for example. The material of the second substrate 10 in the present example is glass. The second substrate 10 can be formed by a conventionally known method. A thickness of the second substrate 10 is set to equal to or larger than 0.5 mm and equal to or smaller than 1 mm, for example. The thickness of the second substrate 10 is set smaller than that of the first substrate 9.

Any of the first substrate 9 and the second substrate 10 may be located on an upper side, however, in the flow path device 2 in the present example, the first substrate 9 is disposed on an upper surface of the second substrate 10.

Figure 7:
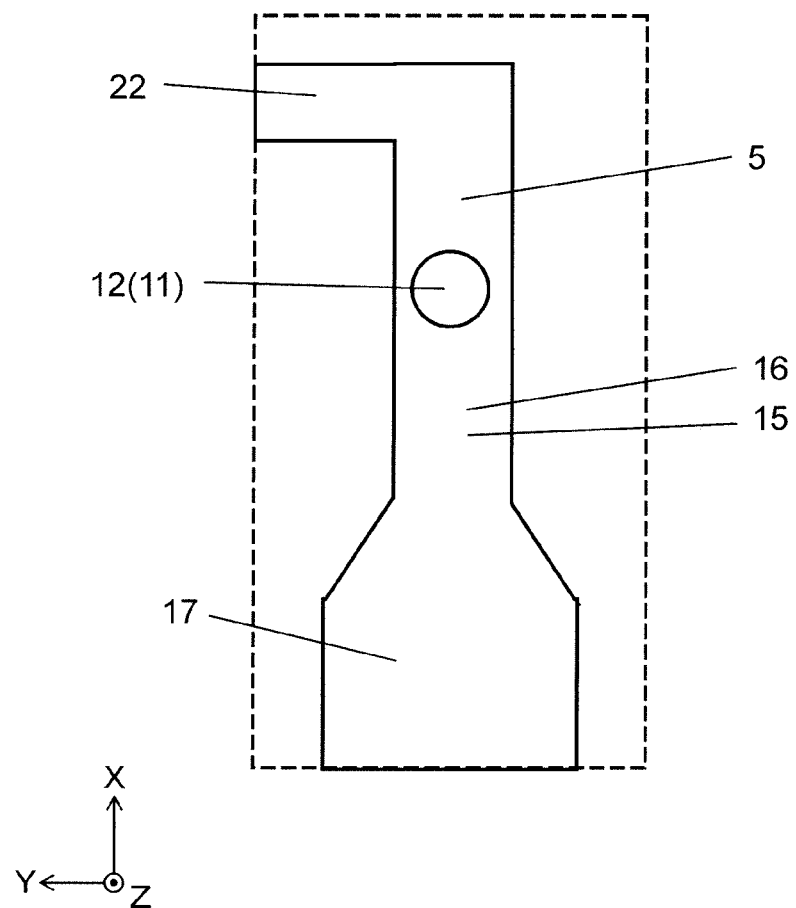
FIG. 7 illustrates a top view showing a part of the example of the flow path device in the measurement apparatus according to the present disclosure.

FIG. 7 schematically illustrates part of the flow path device 2. FIG. 7 illustrates an enlarged top view of a broken line section illustrated in FIG. 6.

The first flow path 5 is a flow path into which at least the first liquid flows. The first flow path 5 includes a plurality of first openings 11 located in both surfaces of the flow path device 2. The plurality of first openings 11 may be openings through which the liquid flows in and flows out, at least. The plurality of first openings 11 include a first flow inlet 12 disposed on an upper surface of the flow path device 2 (the upper surface of the second substrate 10) and a first flow outlet 13 disposed on a lower surface of the flow path device 2 (a lower surface of the first substrate 9). The first flow inlet 12 is an opening through which the liquid flows into the first flow path 5. The first flow outlet 13 is an opening through which the liquid flows from the first flow path 5. An external container or a tube is connected to the first flow inlet 12 to supply the first liquid.

The first flow path 5 further includes a vertical part 14 connected to the first flow inlet 12 and extending in a thickness direction and a planar part 15 connected to the vertical part 14 and extending along one direction of a planar surface. The vertical part 14 is a through hole formed in the first substrate 9. The planar part 15 is a groove formed in the first substrate 9. It is sufficient that a vertical cross-sectional surface (a cross-sectional surface perpendicular to a moving direction of the liquid) of the planar part 15 has a rectangular shape, for example.

The planar part 15 may further include a first planar part 16 connected to the vertical part 14 and a second planar part 17 connected to the first planar part 16 and having a width larger than the first planar part 16. A connection part between the first planar part 16 and the second planar part 17 is gradually widened. An irradiated region irradiated with light from the light emitting element 7 in the optical sensor 3 is the second planar part 17, and this irradiated region becomes the measurement region 105 illustrated in FIG. 1A.

The second planar part 17 may have a height larger than the first planar part 16. Accordingly, the particles can be easily diffused in the first liquid. It is sufficient that the height of the first planar part 16 is 0.2 mm to 1 mm, for example. It is sufficient that the height of the second planar part 17 is 1 mm to 5 mm, for example.

The second flow path 6 is a flow path into which at least the second liquid flows. The second flow path 6 includes a plurality of second openings 18 located in one of both surfaces of the flow path device 2. The plurality of second openings 18 may be openings through which the liquid flows in and flows out, at least. The plurality of second openings 18 include a second flow inlet 19 disposed on the upper surface of the flow path device 2 (an upper surface of the first substrate 9) and a second flow outlet 20 disposed on the lower surface of the flow path device 2 (a lower surface of the second substrate 10). An external container or a tube is connected to the second flow inlet 19 to supply the second liquid.

The second flow path 6 further includes a vertical part (not shown) connected to the second flow inlet 19 and extending in a thickness direction and a third planar part 21 connected to the vertical part and extending along one direction of a planar surface. It is sufficient that part of the third planar part 21 in the second flow path 6 has the same shape as at least the second planar part 17 in the first flow path 5, for example. An irradiated region in the third planar part 21 irradiated with light from the light emitting element 7 in the optical sensor 3 becomes the comparison region 106 illustrated in FIG. 1A. It is sufficient that a position of the part of the third planar part 21 having the same shape as the second planar part 17 in a thickness direction is the same as that in the first flow path 5, for example. The shape and position of the second flow path 6 may not be the same as those of the first flow path 5 as long as the second flow path 6 can function as the flow path for comparison.

The flow path device 2 may further include, in addition to the first flow path 5, a third flow path 22 connected to the first flow path 5. The third flow path 22 may be connected to the planar part 15 of the first flow path 5. The third flow path 22 has a function of sweeping away a sample reaching the planar part 15 by flowing gas, for example. As a result, the retention of the sample in the first flow path 5 (the planar part 15) can be reduced.

In the flow path device 2 in the present example, the third flow path 22 is located to be connected to the connection part between the vertical part 14 and the planar part 15 in the first flow path 5. The third flow path 22 includes a third opening 23 located on the surface of the flow path device 2 (in the present example, the upper surface of the first substrate 9). The third opening 23 is an opening through which an extrusion liquid for sweeping away the sample is flowed in.

The flow path device 2 in the present example may further include the reflection member 24 such as a mirror member, for example, disposed in a region overlapped with the first flow path 5 and the second flow path 6 on the upper surface of the second substrate 10. The reflection member 24 can reflect part of light emitted from the light emitting element 7 in the optical sensor 3 that has passed through each of the first flow path 5 and the second flow path 6 to the light receiving element 8 in the optical sensor 3.

In the flow path device 2, the reflection member 24 reflecting the light emitted from the optical sensor 3 toward the optical sensor 3 is disposed in a region overlapped with the first flow path 5 and the second flow path 6 on an opposite side of the optical sensor 3 for the first flow path 5 and the second flow path 6, thus the light emitted from the optical sensor 3 can be efficiently received in the optical sensor 3 through the first flow path 5 and the second flow path 6. Disturbance light entering the first flow path 5 and the second flow path 6 from a side opposite to the optical sensor 3 can be blocked by the reflection member 24, thus an accuracy of the measurement by the optical sensor 3 can be successfully secured.

It is sufficient that the reflection member 24 is a thin film-like member, for example. It is sufficient that a material of the reflection member 24 needs has a refraction index different from the first substrate 9. The reflection member 24 may be formed of a metal material such as aluminum or gold or a laminated body of a dielectric material such as a dielectric multilayer filter, for example. A refraction index of the reflection member 24 is set to equal to or larger than 1.4 and equal to or smaller than 1.6, for example. The reflection member 24 can be formed on the upper surface of the first substrate 9 by a method such as an evaporation method or a sputtering method, for example.

In the present example, the reflection member 24 is disposed to be overlapped with the first flow path 5 and the second flow path 6 as described hereinafter, however, the reflection member 24 is not limited to an integrated body covering both the first flow path 5 and the second flow path 6, but the reflection members 24 may be disposed separately to be overlapped with each of the first flow path 5 and the second flow path 6. When the reflection members 24 are separately disposed, a light shielding member may be disposed between the reflection members 24 to block the disturbance light. A non-reflection member (light shielding member) may be disposed on the reflection member 24 or in place of the reflection member 24 for preventing a light transmission and an incident of the disturbance light to reliably obtain the effect of blocking the disturbance light.

The flow path device 2 in the present example may include the non-reflection member 24 which does not reflect the light emitted from the optical sensor 3 in a region overlapped with the first flow path 5 and the second flow path 6 on the side opposite to the optical sensor 3 for the first flow path 5 and the second flow path 6, thus part of the light from the optical sensor 3 reflected by the particles included in the first flow path 5 or part of the light from the optical sensor 3 reflected by an interface of the first flow path 5 and the second flow path 6 (a ceiling surface seen from a side of the optical sensor 3) can be received in the optical sensor 3. Accordingly, the reflection from the interface can be measured and a DC offset can be optically performed, and the light reflected by the particles can be successfully received. The disturbance light entering the first flow path 5 and the second flow path 6 from the side opposite to the optical sensor 3 can be reliably blocked by the non-reflection member 24, thus an optical noise is removed and the accuracy of the measurement by the optical sensor 3 can be enhanced. A non-reflection cloth or the like, for example, can be adopted as the non-reflection member 24. A matte coating of black color, for example, may be applied as the non-reflection member 24. When the non-reflection member 24 is disposed in place of the reflection member 24, the non-reflection member 24 is preferably made up of an integrated body covering both the first flow path 5 and the second flow path 6 over a whole region measured by the optical sensor 3.

Figure 9A:
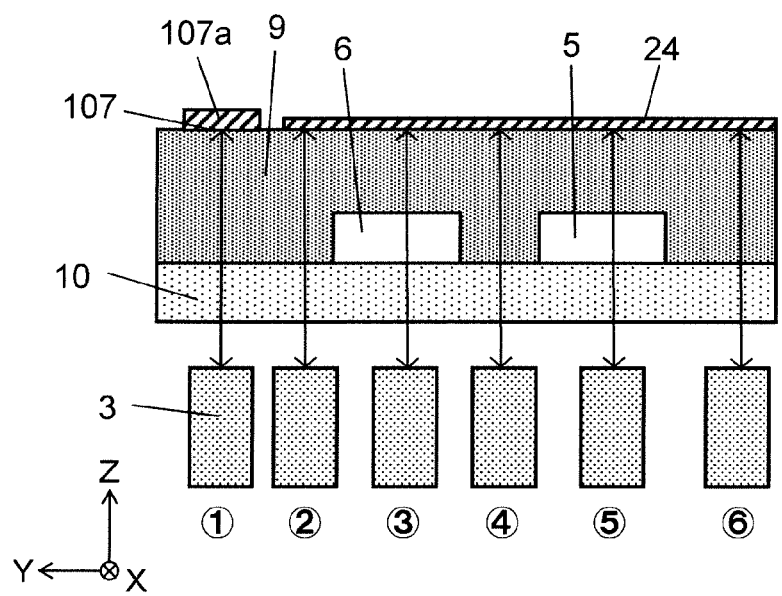
FIGS. 9A and 9B illustrate a part of an example of the measurement apparatus according to the present disclosure.

The flow path device 2 in the present example includes the calibration region 107 in a non-reflection region as illustrated by a cross-sectional view in FIG. 9A. A region of part of the flow path device 2 where the first flow path 5 and the second flow path 6 are not located and where the reflection member 24 is not disposed in a top view can be used as the non-reflection region. A non-reflection member 107a for reference which does not reflect the light emitted from the optical sensor 3 may be disposed on the non-reflection region. The non-reflection member 107a can be used for the calibration on the light receiving element 8 of the optical sensor 3, and serves as a standard in the measurement by the optical sensor 3. The intensity of the reflection light on the non-reflection member 107a is used as a standard, thus an influence of noise occurring at the time of using the optical sensor 3 can be reduced. A portion where the non-reflection member 107a is disposed is a portion functioning as the calibration region 107. A non-reflection cloth or the like, for example, may be disposed as the non-reflection member 107a, and a matte coating of black color or the like may be applied to form the non-reflection member 107a.

The non-reflection member 107a may be disposed on the lower surface of the second substrate 10 in a region corresponding to the non-reflection region but not overlapped with the first flow path 5 and the second flow path 6. A portion where the non-reflection member 107a is disposed is also a portion functioning as the calibration region 107. Also in this case, the intensity of the reflection light on the non-reflection member 107a is used as a standard, thus an influence of noise occurring at the time of using the optical sensor 3 can be reduced.

As schematically illustrated by a block diagram in FIG. 4, the measurement device 1 of the present example further includes a first pump 26 supplying the first liquid to the first flow path 5, a second pump 27 supplying the second liquid to the second flow path 6, and a third pump 28 supplying air (also referred to as gas hereinafter) to the third flow path 22. The first pump 26, the second pump 27, and the third pump 28 lead to the first opening 11, the second opening 18, and the third opening 23, respectively, via a plurality of other flow paths (not shown) such as tubes.

Figure 8:
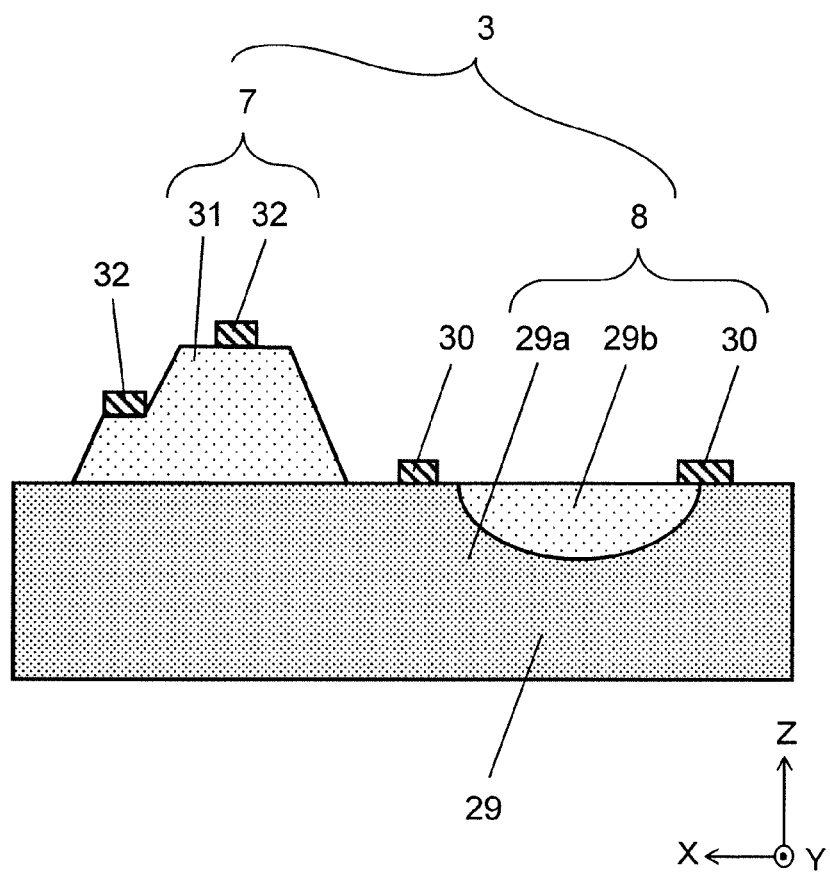
FIG. 8 illustrates a cross-sectional view showing an example of an optical sensor in the measurement apparatus according to the present disclosure.

FIG. 8 schematically illustrates an example of the optical sensor 3. FIG. 8 illustrates an enlarged cross-sectional view of the optical sensor 3 illustrated in FIG. 5.

The optical sensor 3 is a sensor for measuring the particles in the first liquid. The optical sensor 3 includes the light-emitting element 7 and the light receiving element 8 as described above. The light receiving element 8 in the present example includes a semiconductor substrate 29 including one conductive type region 29a and the other conductive type region 29b on an upper surface thereof and a pair of first electrodes 30. The light emitting element 7 in the present example includes a plurality of semiconductor layers 31 located away from part of the semiconductor substrate 29 functioning as the light receiving element 8 and a pair of second electrodes 32.

The optical sensor 3 is disposed to be movable by a rotary drive of the arm-like member 100 in a planar surface direction with respect to the surface of the flow path device 2. Accordingly, the measurement apparatus 1 can irradiate the measurement region 105 in the first flow path 5, the comparison region 106 in the second flow path 6, and the calibration region 107 with the light in sequence while moving the optical sensor 3, thus can measure the intensity of the light on each region.

In this manner, in the optical sensor 3, the light emitting element 7 and the light receiving element 8 are integrally disposed on one semiconductor substrate 29, thus the optical sensor 3 can be downsized and a focal distance of the optical sensor 3 can be reduced, and the measurement can also be performed accurately on a minute region.

Described herein is an example that the light emitting element 7 and the light receiving element 8 are formed on one semiconductor substrate 29 as the optical sensor 3, however, the configuration of the optical sensor 3 is not limited thereto. Also applicable is a configuration that the light emitting element 7 and the light receiving element 8 are independently mounted on one substrate and integrally disposed thereon.

The controller 4 can control various operations and the like in the measurement apparatus 1. Specifically, the controller 4 can also control driving of the optical sensor 3, the first pump 26, the second pump 27, the third pump 28, and the like. The controller 4 can drive the first pump 26 to flow the first liquid into the first flow path 5. The controller 4 can drive the second pump 27 to flow the second liquid into the second flow path 6. The controller 4 can drive the third pump 28 to flow the gas into the third flow path 22. Furthermore, the controller 4 can also control the operation of the rotary drive actuator 102 not shown in FIG. 4. The controller 4 is made up of a combination of various circuits.

The controller 4 can calculate a measurement result based on an output result of the optical sensor 3. The controller 4 compares the intensity of the light passing through the first flow path 5 and the intensity of the light passing through the second flow path 6, thereby being able to measure first particles in the first flow path 5. A mechanism of the measurement is described with reference to FIGS. 9A and 9B. FIG. 9A illustrates a cross-sectional view of the measurement apparatus 1 cut along a B-B line illustrated in FIG. 3 and FIG. 6, and FIG. 9B illustrates a drawing for describing the mechanism of the measurement.

Figure 9B:
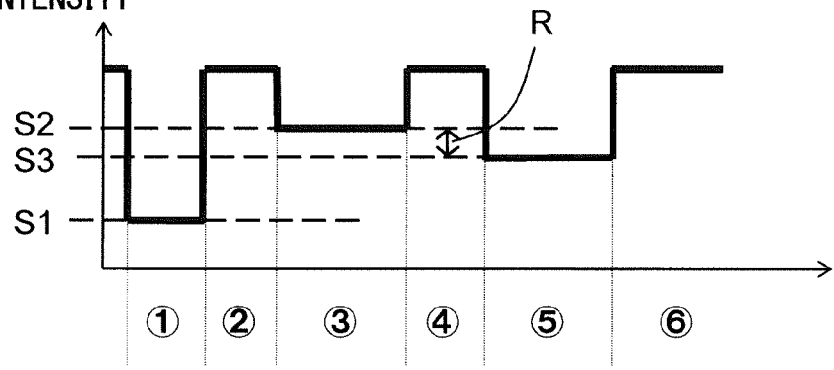

Firstly, the optical sensor 3 measures the intensity of the light corresponding to the non-reflection member 107a functioning as the calibration region 107, and outputs a calibration signal S1 as a calibrated reference signal (circled number 1 in FIGS. 9A and 9B). Next, the optical sensor 3 measures the intensity of the light passing through the first substrate 9 and the second substrate 10 in a portion before reaching the second flow path 6 (the reflection light from the reflection member 24 or the non-reflection member 24), however, this process is not particularly necessary for the measurement (a circled number 2). Next, the optical sensor 3 measures the intensity of the light passing through the second liquid in the comparison region 106 in the second flow path 6 (the reflection light from the reflection member 24 or the non-reflection member 24), and outputs a comparison signal S2 (a circled number 3). The comparison signal S2 is a signal which can be used as a calibration signal when the calibration signal S1 is not used. Next, the optical sensor 3 measures the intensity of the light passing through the first substrate 9 and the second substrate 10 in a portion between the second flow path 6 and the first flow path 5 (the reflection light from the reflection member 24 or the non-reflection member 24), however, this process is not particularly necessary for the measurement (a circled number 4). Next, the optical sensor 3 measures the intensity of the light passing through the first liquid in the measurement region 105 in the first flow path 5 (the reflection light from the reflection member 24 or the non-reflection member 24, however, in a case where the non-reflection member 24 is disposed, substantially the light other than the light not reflected by the non-reflection member 24 such as the refection light from the particles and the interface (the ceiling surface) of the first flow path 5, for example), and outputs a measurement signal S3 (a circled number 5). Subsequently, the optical sensor 3 measures the intensity of the light passing through the first substrate 9 and the second substrate 10 in a portion after passing through the first flow path 5 (the reflection light from the reflection member 24 or the non-reflection member 24), however, this process is not also particularly necessary for the measurement (a circled number 6).

Calculated next is a measurement value R (=(S2−S1)−(S3−S1)=S2−S3) obtained by subtracting a difference between the measurement signal S3 and the calibration signal S1 (S3−S1) on the first flow path 5 from a difference between the comparison signal S2 and the calibration signal S1 (S2−S1) on the second flow path 6. Then, the measurement value R and the value of the standard curve previously stored in the controller 4 are compared with each other, thus the number of particles in the first liquid in the first flow path 5 can be estimated.

Figure 10:
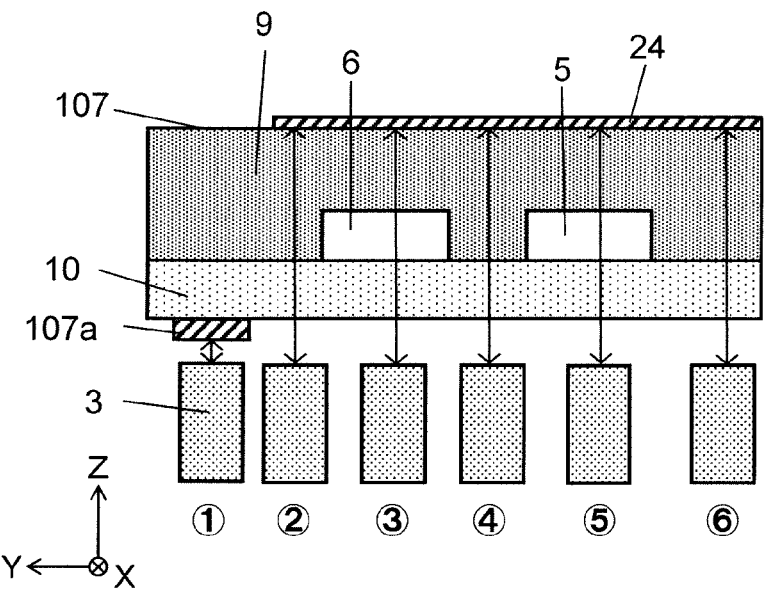
FIG. 10 illustrates a cross-sectional view showing a part of another example of the measurement apparatus according to the present disclosure.

The mechanism of the measurement described above is similar to that in a case where the non-reflection member 107a as the calibration region 107 is disposed on a side of the optical sensor 3 of the flow path device 2 (the lower surface of the second substrate 10) as illustrated by a cross-sectional view, which is similar to that in FIG. 9A, in FIG. 10.

Herein, when each difference between the calibration signal S1 and the comparison signal signals S2 and between the calibration signal S1 and the measurement signal S3 corresponding to a light loss caused by a measured object is sufficiently large, it is applicable to locate the reflection member 24 which is the reflection member, however, when the difference therebetween is small, the accurate measurement is hardly performed in some cases. Considered as a measure against the above state is that the light output of the light emitting element 7 in the optical sensor 3 is increased or an amplification factor of the signal is increased after the light receiving element 8 receives the light. However, the light output of the light emitting element 7 cannot be increased easily in many cases, and there is a limitation on an amplifier circuit in increasing the amplification factor of the signal, so that an amplification range is limited, for example. Also considered is a method of subtracting a certain output on a circuit of a signal process and then performing an amplification, however, in subtracting the certain output, a noise component remains as it is although the signal gets small accordingly, thus there is a problem that the noise component is amplified more after the amplification.

In contrast, according to the measurement apparatus 1 and the measurement method in the present example described above, the optical signal is optically subtracted in measuring the light output, thus light, which has passed outside through the flow path device 2, reflected and returning and external light entering as disturbance light can be effectively suppressed. Accordingly, a setting of a DC offset can be optically performed in the measurement, extra light emitted from outside can be blocked, and a stable measurement can be performed on the flow path device 2. As a result, the accurate measurement can be stably performed.

According to the measurement apparatus 1 and the measurement method in the present example, the calibration region 107 by the non-reflection member 107a, the measurement region 105 in the first flow path 5, and the comparison region 106 in the second flow path 6 are integrally disposed and the measurement is performed while moving the optical sensor 3 by the rotary drive of the arm-like member 100 to scan them, thus a desired signal and data can be obtained by one measurement in a short time, and a measurement error caused by an output fluctuation of the light emitting element 7 and the like, for example, can be reduced.

In a case where a calculation of the signal in the controller 4 is performed with a light loss of −10×log (measurement signal/reference signal), for example, a calculation result is hardly influenced and does not change even when the emission intensity of the light emitting element 7 is changed to an appreciable degree, thus is also hardly influenced by the deterioration of the light emitting element 7 in a long-term use, and the stable measurement can be achieved.

The signals of the circled numbers 2, 4, and 6 described in the mechanism of the measurement described above are compared with each other or compared with the calibration signal S1, the comparison signal S2, and the measurement signal S3, thus also achievable is the confirmation whether the flow path device 2 and the optical sensor 3 are disposed relatively in a correct position at a correct angle.

The data of the standard curve (standard data) needs not necessarily be stored in the controller 4. For example, also applicable is that the data is recorded in the other storage medium connected to the controller via network and drawn out with an access to the storage medium for each measurement.

When the controller 4 obtains the comparison signal S2, the controller 4 may compare the comparison signal S2 with a reference signal of the second liquid in the standard data. As a result, when there is a large difference between these signals, it can be determined that a defect occurs in the measurement. As a result, the above configuration helps with the collection of only the accurate measurement data.

The optical sensor 3 may irradiate each of the measurement region 105 in the first flow path 5 and the comparison region 106 in the second flow path 6 with the light for each measurement, and receive the light passing through each of the first flow path 5 and the second flow path 6. The controller 4 may compare the intensity of the light passing through the first flow path 5 and the intensity of the light passing through the second flow path 6 for each measurement. As a result, for example, when particles such as white blood cells in blood are measured, a slight fluctuation of the light output has a large influence on the measurement result, thus the above configuration can improve the measurement accuracy of the particles.

The controller 4 may output an error signal when the calibration signal S1 is lower than an optional reference value at the time of obtaining the calibration signal S1. As a result, the controller 4 can inform a length of life of the light emitting element 7 of the optical sensor 3, for example. A value obtained by subtracting a certain value from a reference signal of the second liquid in the standard data may be adopted as the reference value.

The controller 4 may return the optical sensor 3 to an original position after the optical sensor 3 outputs each of the signals S1, S2, and S3. The controller 4 needs not return the optical sensor 3 to an original position after the optical sensor 3 outputs each of the signals S1, S2, and S3. When the controller 4 does not return the optical sensor 3 to the original position, the controller 4 may perform the next measurement from an opposite direction.

The controller 4 may turn off the optical sensor 3 while moving the optical sensor 3 after turning on the optical sensor 3 and making the optical sensor 3 output each of the signals S1, S2, and S3. The controller 4 may pulse-drive and blink the optical sensor 3 during the measurement. As a result, the deterioration of the light emitting element 7 of the optical sensor 3 can be reduced compared with the case of continuously turning on the optical sensor 3.

It is also applicable that the controller 4 locates the first liquid recovery container 108 to correspond to the first flow outlet 13, and then drives the third pump 28 to eject the first liquid which has been flowed in the first flow path 5 in the measurement region 105 after finishing the measurement. The finish of the measurement may be determined when the optical sensor 3 outputs each of the signals 51, S2, and S3. The finish of the measurement may be determined when the optical sensor 3 starts moving with respect to the flow path device 2 and returns to the original position. The finish of the measurement may be determined by making the optical sensor 3 measure the calibration region 107, the measurement region 105 in the first flow path 5, and the comparison region 106 in the second flow path 6 and then measure the calibration region 107 again. The finish of the measurement may be determined after an elapse of a certain period of time of driving the optical sensor 3.

The controller 4 may drive the third pump 28 after an elapse of a certain period of time of driving the first pump 26. As a result, the first liquid flowing into the first flow path 5 by driving the first pump 26 can be moved and conveyed in the first flow path 5 by flowing gas into the first flow path 5 via the third flow path 22 by driving the third pump 28. As a result, the first liquid in the first flow path 5 moves fast, and the measurement efficiency can be improved.

The controller 4 may change a pressure of the gas in the third flow path 22 using the third pump 28 after the first liquid flows into the first flow path 5. As a result, the first liquid flowing into the first flow path 5 can be stirred and the particles in the first liquid can be stirred. The measurement accuracy can be improved by stirring the particles to be measured.

It is also applicable that the controller 4 confirms the first liquid flowing into the first flow path 5 using the optical sensor 3, and then stirs the first liquid using the third pump 28 to start stirring the particles. Accordingly, it is possible to reduce the first liquid in the first flow path 5 leaking from the third flow path 22 due to an excessive reduction in the pressure in the first flow path 5 by the third pump 28. Specifically, when the first liquid including the particles flows into the first flow path 5, the measurement signal S3 of the optical sensor 3 is smaller than the case where no particle is included, thus it may be determined that the first liquid flows into the first flow path 5 when the measurement signal S3 gets small.

The controller 4 may stir the first liquid after an elapse of a certain period of time of driving the first pump 26 to start stirring the particles. Accordingly, the deterioration of the light emitting element 7 can be reduced. In this case, a start position of stirring the particles may be located in front of the irradiated region of the light emitting element 7. In this case, it is also applicable that the gas is made to flow into the first flow path 5 via the third flow path 22 using the third pump 28 to push the first liquid to the irradiated region of the light emitting element 7 after the stirring of the particles is finished.

The controller 4 may drive the optical sensor 3 while changing a pressure in the first flow path 5 using the third pump 28. That is to say, it is also applicable to stop the first pump 26 leading to the first flow path 5 and the third flow path 22 and drive the third pump 28. As a result, it can be confirmed whether the particles to be measured are stirred. That is to say, when the particles are collected, the measurement signal S3 gets small, and when the particles are stirred and are not collected, the measurement signal S3 gets large in some cases. Accordingly, when it is confirmed that the fluctuation of the measurement signal S3 is within a certain range, it can be confirmed whether the particles are stirred. Specifically, it is applicable that when a difference between the latest measurement signal S3 (or the measurement value R) and the same index of the immediately preceding five signals is equal to or smaller than ±5%, the stirring of the particles is determined to be completed, for example.

The controller 4 may make the optical sensor 3 stand by in a position of measuring the first flow path 5 during the stirring of the particles to be measured. Accordingly, the measurement efficiency can be improved.

When the controller 4 makes the optical sensor 3 stand by during the stirring of the particles, the controller 4 may blink the optical sensor 3. Accordingly, the deterioration of the light emitting element 7 can be reduced.

When the controller 4 makes the optical sensor 3 stand by during the stirring of the particles, the controller 4 preferably measures the second flow path 6 after completing the stirring of the particles. Accordingly, the measurement accuracy can be improved.

The controller 4 may stir the first liquid using the third pump 28 and flow the second liquid into the second flow path 6 using the second pump 27. That is to say, the controller 4 may drive the second pump 27 to flow the second liquid into the second flow path 6 before completing the stirring of the particles to be measured. As a result, the measurement efficiency can be improved. The second pump 27 may be driven at the same time as the first pump 26 or the third pump 28, or may be driven earlier than the first pump 26 and the third pump 28.

Next, another example of the measurement apparatus according to the present disclosure is described.

Figure 11:
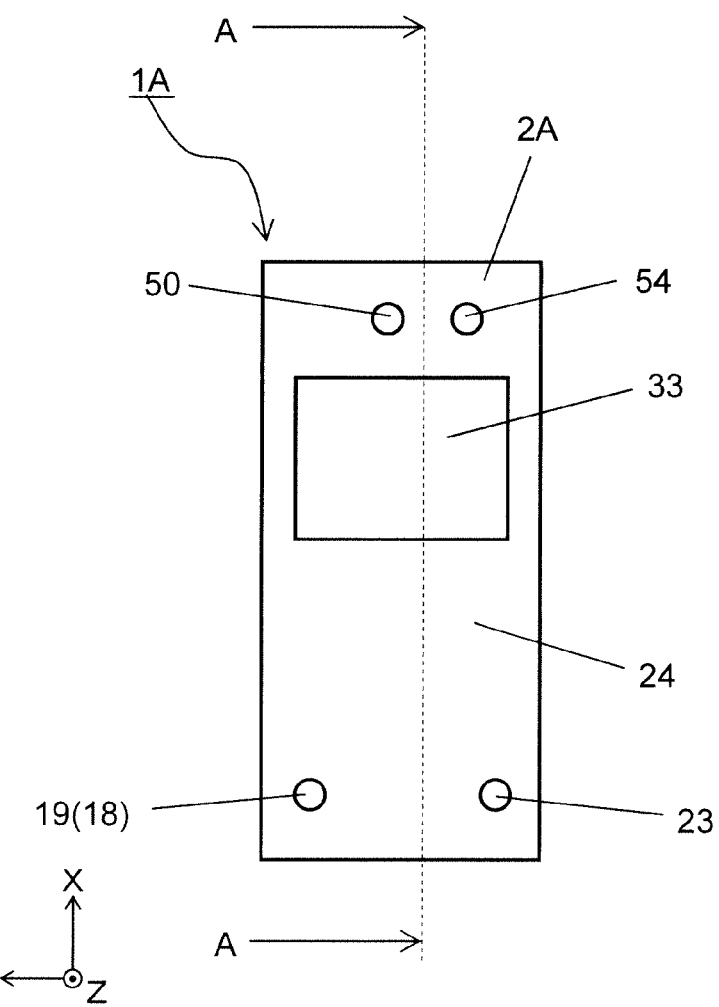
FIG. 11 illustrates a top view showing another example of the measurement apparatus according to the present disclosure.
Figure 12:
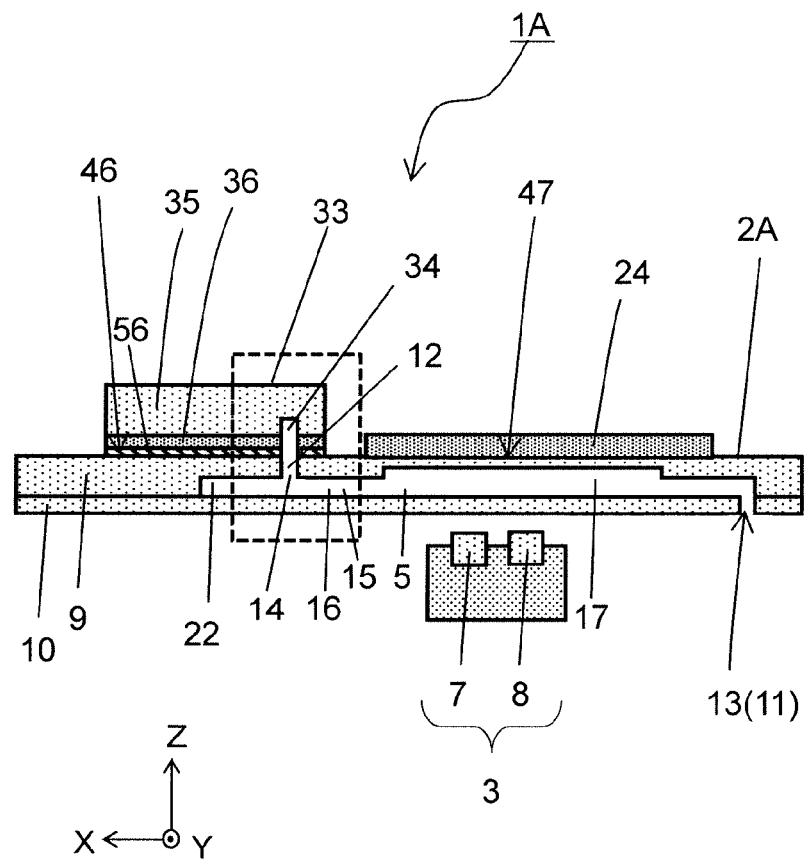
FIG. 12 illustrates a cross-sectional view showing a part of another example of the measurement apparatus according to the present disclosure.
Figure 13:
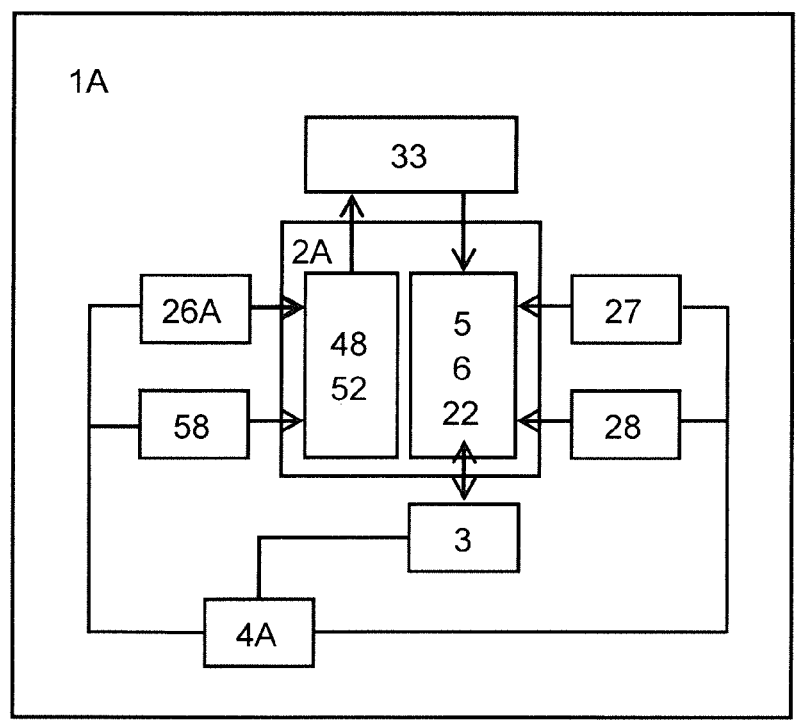
FIG. 13 illustrates a block diagram schematically showing a part of a configuration of another example of the measurement apparatus according to the present disclosure.

FIGS. 11 to 13 schematically illustrate a part of a measurement apparatus 1A of another example. FIG. 11 illustrates a top view of the measurement apparatus 1A when seen from an upper surface. FIG. 12 illustrates a cross-sectional view of the measurement apparatus 1A, and illustrates a cross-sectional view of the measurement apparatus 1A cut along an A-A line illustrated in FIG. 11. FIG. 13 illustrates a conceptual diagram of the measurement apparatus 1A, and illustrates a relationship between constituent elements using a block diagram. Also in these drawings, the illustration of the mechanism configured to rotationally drive the optical sensor 3 is omitted.

The measurement apparatus 1A further includes a separation flow path device 33 located on an upper surface of a flow path device 2A. The separation flow path device 33 is a flow path for separating and taking specific particles to be measured out of the sample to select them. The measurement apparatus 1A includes the flow path device 2A and the separation flow path device 33, thus can separate and select the particles to be measured from the sample through a continuous process, and a working efficiency can be improved. In the description of the present example hereinafter, the flow path device 2A is referred to as the "measurement flow path device 2A".

Figure 14:
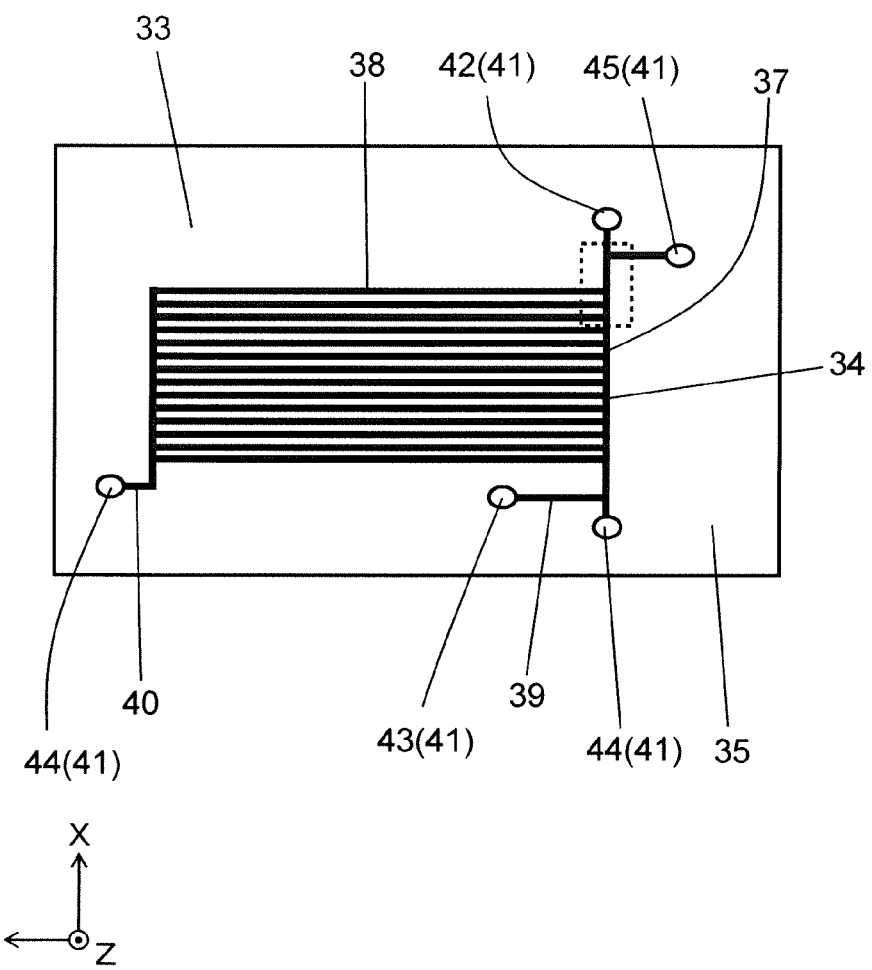
FIG. 14 illustrates a top view showing a part of another example of the flow path device in the measurement apparatus according to the present disclosure.
Figure 15:
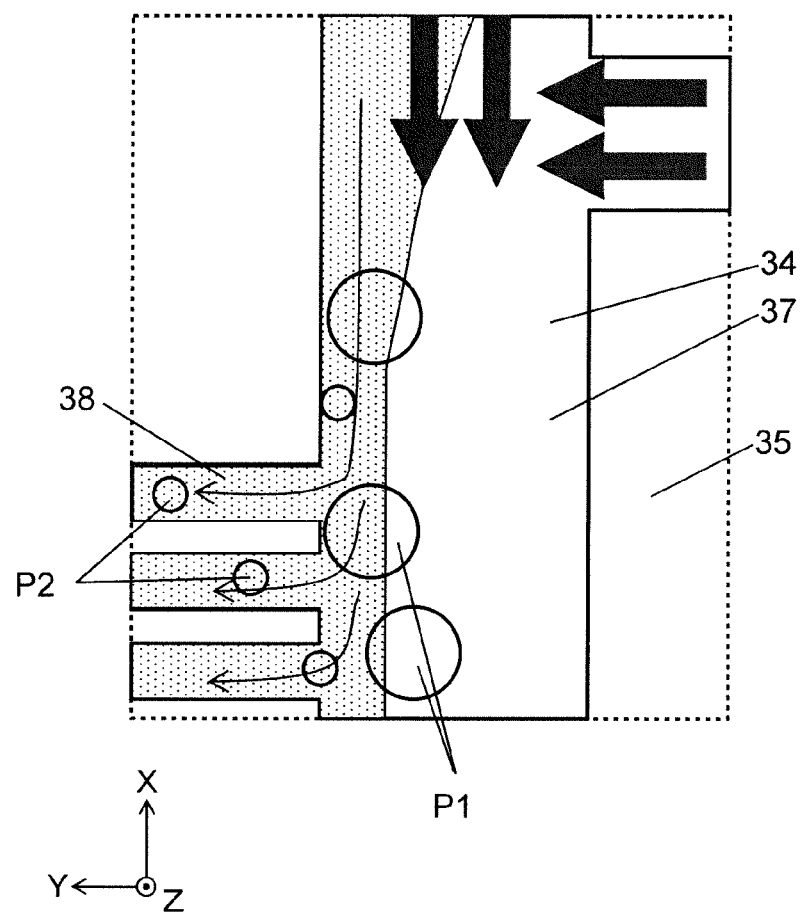
FIG. 15 illustrates a top view showing a part of another example of the flow path device in the measurement apparatus according to the present disclosure.

FIG. 14 and FIG. 15 schematically illustrate the separation flow path device 33. FIG. 14 illustrates a top view of the separation flow path device 33 when seen from an upper surface transparently. FIG. 15 illustrates an enlarged view of a broken line section illustrated in FIG. 14.

The separation flow path device 33 can separate particles included in liquid, select to take the particles out of a sample, and recover the particles. The separation flow path device 33 includes a fourth flow path 34. Accordingly, the particles can be separated and recovered.

The separation flow path device 33 is a plate-like member, for example. A planar shape of the separation flow path device 33 is a rectangular shape, for example, and a surface thereof is a flat surface. The separation flow path device 33 may have a thickness of 1 mm to 5 mm, for example. The planar shape of the separation flow path device 33 may have a short side with a length equal to or larger than 10 mm and equal to or smaller than 30 mm and a long side with a length equal to or larger than 10 mm and equal to or smaller than 50 mm, for example. The separation flow path device 33 can be molded by injection molding, for example.

The separation flow path device 33 is formed mainly of a third substrate 35 and a fourth substrate 36. Specifically, the separation flow path device 33 includes the third substrate 35 with a groove and the fourth substrate 36 located on a surface of the third substrate 35. The fourth substrate 36 covers an opening of the groove in the third substrate 35. That is to say, the groove of the third substrate 35 and the surface of the fourth substrate 36 constitute the fourth flow path 34. The separation flow path device 33 may include a member other than the third substrate 35 and the fourth substrate 36.

The third substrate 35 and the fourth substrate 36 are a flat plate-like member, for example. A material of the third substrate 35 and the fourth substrate 36 may be, for example, glass, an acrylic resin, a polycarbonate resin, polydimethylsiloxane (PDMS) resin, or the like. The material of the third substrate 35 and the fourth substrate 36 in the present example is PDMS.

Any of the third substrate 35 and the fourth substrate 36 may be located on an upper side, however, in the separation flow path device 33 in the present example, the third substrate 35 is disposed on an upper surface of the fourth substrate 36.

The fourth flow path 34 includes a fourth main flow path 37 and a fourth branch flow path 38 branching from the fourth main flow path 37. In the separation flow path device 33 according to the present example, the liquid flowing in the separation flow path device 33 flows into the fourth main flow path 37, and only particles (second particles P2) different from the specific particles (first particles P1) to be measured flow from the fourth main flow path 37 into the fourth branch flow path 38, thus the specific particles are separated and recovered, and the separated specific particles (first particles P1) can be included in the sample and recovered. Only the different particles flow into the fourth branch flow path 38, thus the different particles (second particles P2) can be separated toward a side of the fourth branch flow path 38 and recovered.

The fourth branch flow path 38 is designed so that only the second particles P2 are branched, however, only the second particles P2 are not necessarily branched. That is to say, particles different from the second particles P2 may flow into the fourth branch flow path 38 in some cases.

FIG. 15 schematically illustrates a separation of the first particles P1 and the second particles P2. A large circle in FIG. 15 indicates the first particle P1 and a small circle indicates the second particle P2. A thick arrow along an X axis direction indicates a main stream and a thick arrow along a Y axis direction indicates a "pressing flow" described hereinafter. A hatched region in FIG. 15 indicates a "lead-in flow" described hereinafter.

The fourth flow path 34 in the present example includes one fourth main flow path 37 and the plurality of fourth branch flow paths 38 connected to one side of the one fourth main flow path 37. In the separation flow path device 33, a sectional area and length of each of the fourth main flow path 37 and the fourth branch flow path 38 and a flow rate of the sample are adjusted, thus the "lead-in flow", which flows from the fourth main flow path 37 into the fourth branch flow path 38 can be generated in the fourth main flow path 37. The separation flow path device 33 generates the pressing flow, which can press the sample flowing in the fourth main flow path 37 against the side of the fourth branch flow path 38, in the fourth flow path 34. As a result, as illustrated in FIG. 15, a width of the lead-in flow is set larger than a barycentric position of the predetermined particle (the second particle P2) flowing in the sample and smaller than a barycentric position of the other particle (the first particle P1), thus the predetermined particles (the second particles P2) can be lead in the fourth branch flow path 38.

The separation flow path device 33 in the present example is particularly intended to separate red blood cell (erythrocyte) (the second particle P2) and white blood cell (the first particle P1) in blood. A barycentric position of the red blood cell in the blood is located 2 μm to 2.5 μm away from an edge thereof, for example, and a barycentric position of the white blood cell is 5 μm to 10 μm away from an edge thereof, for example. In this case, it is sufficient that the fourth main flow path 37 has a sectional area ranging from 300 μm² to 1000 μm² and a length ranging from 0.5 mm to 20 mm, for example. it is sufficient that the fourth branch flow path 38 has a sectional area ranging from 100 μm² to 500 μm² and a length ranging from 3 mm to 25 mm, for example. It is sufficient that the flow rate in the fourth flow path 34 is equal to or larger than 0.2 m/s and equal to or smaller than 5 m/s, for example. As a result, the width of the lead-in flow can be set equal to or larger than 2 μm and equal to or smaller than 15 μm, for example, thus the red blood cell as the second particle P2 and the white blood cell as the first particle P1 can be separated from the blood.

The fourth flow path 34 further includes a fourth recovery flow path 39 connected to the fourth main flow path 37, and can recover the first particles P1. In the fourth flow path 34 in the present disclosure, the first particles P1 can be recovered in the fourth recovery flow path 39 using the pressing flow.

The fourth flow path 34 may include a fourth disposal flow path 40 connected to the plurality of fourth branch flow paths 38. The fourth disposal flow path 40 may recover or dispose of the separated second particles P2. When the second particles P2 are recovered by the plurality of fourth branch flow paths 38, one fourth disposal flow path 40 to which the plurality of fourth branch flow paths 38 are connected functions as a flow path for recovering the second particles P2. The liquid flowing to an end of the fourth main flow path 37 may be disposed of in this case.

The fourth flow path 34 includes a plurality of fourth openings 41 located on the surface of the separation flow path device 33. The plurality of fourth openings 41 include a fourth sample flow inlet 42 through which the sample flows into at least the fourth main flow path 37, a fourth sample flow outlet 43 through which the first particles are recovered from the fourth recovery flow path 39, and at least one fourth disposal flow outlet 44 through which constituents in which the first particles are removed from the sample are recovered. Included in the present example is a fourth pressing flow inlet 45 through which third liquid for pressing the sample against the side of the fourth branch flow path 38 flows. In the present example, the fourth disposal flow outlet 44 is connected to the fourth main flow path 37 and the fourth disposal flow path 40. The liquid flowing out through the fourth disposal flow outlet 44 is recovered through a through hole 44' formed in the second flow path device 2A described hereinafter. The fourth sample flow outlet 43 is connected to the first flow inlet 12 of the first flow path 5 in the measurement flow path device 2A.

Figure 16:
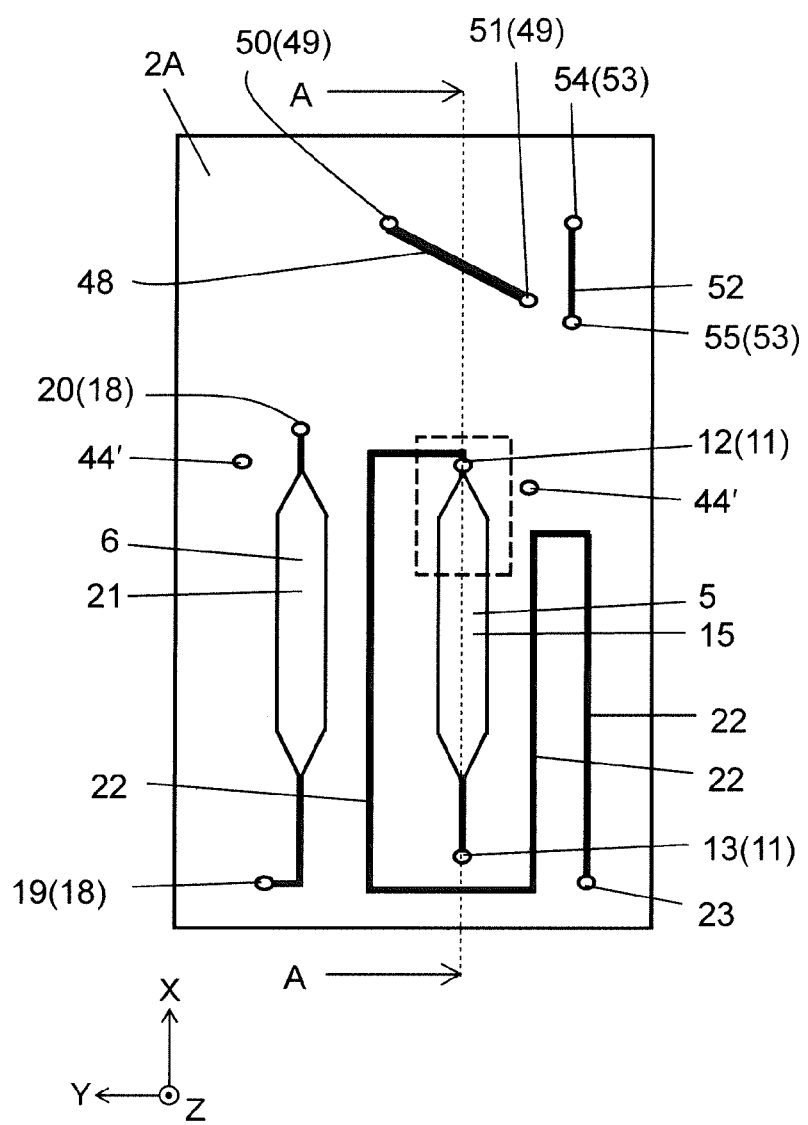
FIG. 16 illustrates a top view showing a part of another example of the flow path device in the measurement apparatus according to the present disclosure.

Next, FIG. 16 schematically illustrates the measurement flow path device 2A. FIG. 16 illustrates a top view of the measurement flow path device 2A when seen from an upper surface transparently.

An upper surface of the measurement flow path device 2A in the present example includes a first region 46 where the separation flow path device 33 is disposed and a second region 47 which is not overlapped with the first region 46 as with the example illustrated in FIG. 12. In a top view, the first flow path 5 in the measurement flow path device 2A is located to extend from the first region 46 to the second region 47, and the separation flow path device 33 is located only in the first region 46 in the measurement flow path device 2A. Accordingly, the first flow path 5 is exposed to the second region 47, thus the second region 47 can be used as a measurement region (the measurement region 105 and the comparison region 106). The reflection member 24 is located in the second region 47 in the present example.

The measurement flow path device 2A may further include a fifth flow path 48 different from the first flow path 5, the second flow path 6, and the third flow path 22. The fifth flow path 48 may include a plurality of fifth openings 49 located on a surface of the measurement flow path device 2A. The fifth flow path 48 can function as a flow path in which the sample before the particles are separated flows.

The plurality of fifth openings 49 include a fifth flow inlet 50 and a fifth flow outlet 51. The fifth flow inlet 50 is an opening through which the sample flows into the fifth flow path 48. The fifth flow outlet 51 is an opening through which the sample flows from the fifth flow path 48. The fifth flow inlet 50 is exposed outside, and the fifth flow outlet 51 is connected to the fourth sample flow inlet 42 of the separation flow path device 33.

The fifth flow inlet 50 and the fifth flow outlet 51 are located in the upper surface of the measurement flow path device 2A (the upper surface of the first substrate 9). In the present example, the fifth flow inlet 50 is located in the same surface as that of the first flow inlet 12. In the present example, the fifth flow outlet 51 is located in the same surface as that of the first flow inlet 12. The fifth flow outlet 51 is located in the same surface as that of the fifth flow inlet 50 of the plurality of fifth openings 49 and the third opening 23.

The measurement flow path device 2A may further include a sixth flow path 52 different from the first flow path 5, the second flow path 6, the third flow path 22, and the fifth flow path 48. The sixth flow path 52 includes a plurality of sixth openings 53 located in the surface of the measurement flow path device 2A. The plurality of sixth openings 53 include a sixth flow inlet 54 and a sixth flow outlet 55. The sixth flow inlet 54 is an opening through which the third liquid for a pressing flow in the separation flow path device 33 flows into the sixth flow path 52. The sixth flow outlet 55 is an opening through which the third liquid flows from the sixth flow path 52. The sixth flow inlet 54 is exposed outside, and the sixth flow outlet 55 is connected to the fourth pressing flow inlet 45 of the separation flow path device 33.

Figure 17:
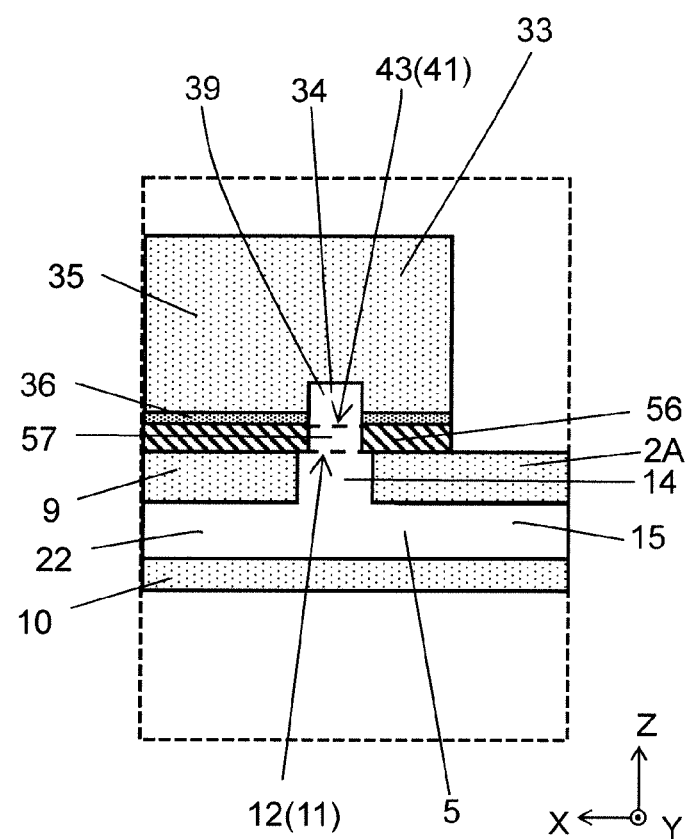
FIG. 17 illustrates a cross-sectional view showing a part of another example of the flow path device in the measurement apparatus according to the present disclosure.

Next, FIG. 17 schematically illustrates a connection structure of the separation flow path device 33 and the measurement flow path device 2A. FIG. 17 illustrates an enlarged cross-sectional view of a broken line section in FIG. 12.

The separation flow path device 33 is located on the upper surface of the measurement flow path device 2A as described above. Specifically, a sheet member 56 may intervene between the lower surface of the separation flow path device 33 and the upper surface of the measurement flow path device 2A. In other words, the measurement apparatus 1 may include the sheet member 56 located between the separation flow path device 33 and the measurement flow path device 2A.

The sheet member 56 has a function as an intermediate layer for bonding hardly-adhesive materials. The sheet member 56 may be formed of a material such as silicone or PDMS, for example. The sheet member 56 includes a plurality of through holes 57. The liquid flows between the separation flow path device 33 and the measurement flow path device 2A via the through holes 57. The separation flow path device 33 and the measurement flow path device 2A in the present example are connected via an adhesive agent applied to a lower surface of the sheet member 56.

As illustrated in FIG. 13, the measurement apparatus 1A of the present example further includes a first pump 26A supplying the first liquid to the fifth flow path 48 and a fourth pump 58 supplying the third liquid to a sixth flow path 52. The first pump 26A corresponds to the first pump 26 in the example described above. That is to say, the first pump 26A supplies the first liquid to the first flow path 5, the first liquid passing through the fifth flow path 48 and the fourth flow path 34 in this order. The first pump 26A, the second pump 27, the third pump 28, and the fourth pump 58 lead to the fifth opening 49, the second opening 18, the third opening 23, and the sixth opening 53, respectively, via a plurality of other flow paths (not shown) such as tubes.

The controller 4A can control the measurement apparatus 1A. Specifically, the controller 4A can also control driving of the optical sensor 3, the first pump 26A, the second pump 27, the third pump 28, and the fourth pump 58, for example. The controller 4A can drive the first pump 26A to flow the liquid including the specific particles as the first liquid into the first flow path 5. The controller 4A can drive the second pump 27 to flow the liquid which does not include the specific particles as the second liquid into the second flow path 6. The controller 4A can drive the third pump 28 to flow the air (gas) into the third flow path 22. Furthermore, the controller 4A can also control the operation of the rotary drive actuator 102 not shown in FIG. 13. The controller 4A is made up of a combination of various circuits.

The controller 4A may flow the sample into the fourth main flow path 37 of the fourth flow path 34 after flowing the third liquid into the fourth main flow path 37 of the fourth flow path 34. The controller 4A may drive the first pump 26 to flow the sample into the fourth main flow path 37 after driving the fourth pump 58 to flow the third liquid into the fourth main flow path 37.

The present disclosure is not limited to the examples of the embodiments described above. That is to say, each constituent element of the first example and the second example described above may be appropriately combined, and various alternation and modifications, for example, should be possible within the scope of the present disclosure.

Figure 18:
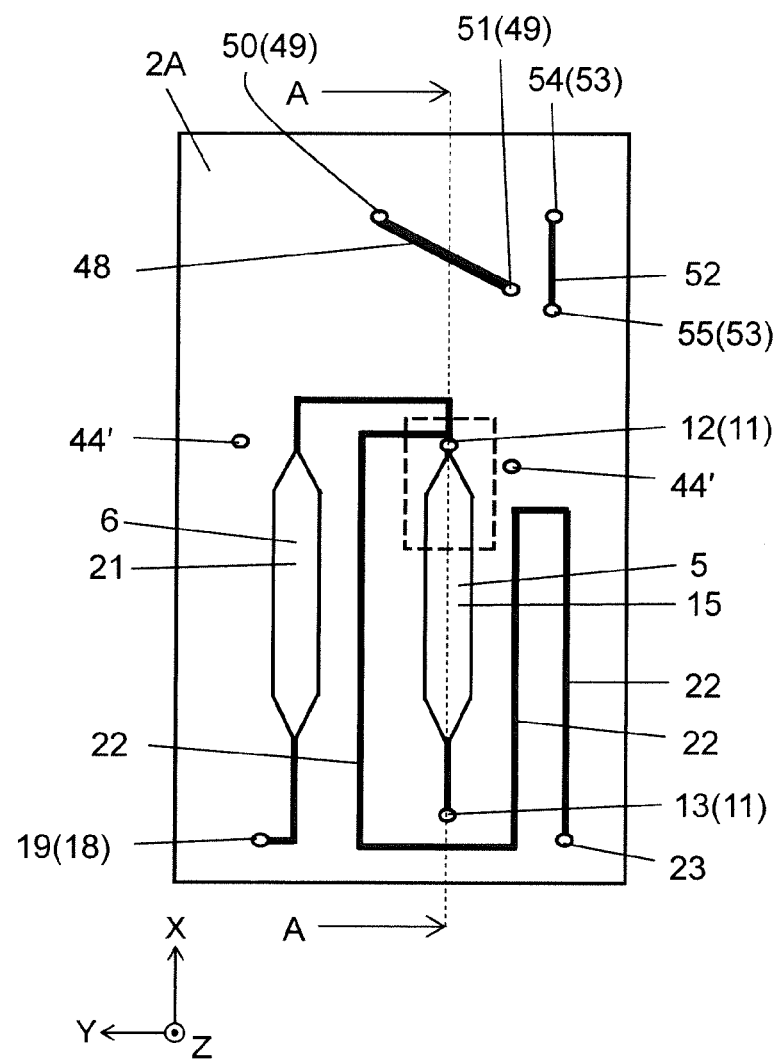
FIG. 18 illustrates a top view showing a part of another example of the flow path device in the measurement apparatus according to the present disclosure.

The above example describes the example that one end of the second flow path 6 includes the second flow outlet 20, however, as illustrated in FIG. 18, one end of the second flow path 6 may be connected to the first flow path 5. When the second flow path 6 is connected to the first flow path 5, it is possible to flow the second liquid into the first flow path 5 via the second flow path 6. As a result, when an amount of the first liquid flowing into the first flow path 5 is small, it is possible to replenish the first flow path 5 with the second liquid from the second flow path 6. In this case, the second liquid may be the same fluid as the third liquid.

When the second flow path 6 is connected to the first flow path 5, the controller 4 may flow a certain amount of second liquid into the first flow path 5 before the first liquid reaches the first flow path 5. As a result, the amount of the first particles included in a certain amount of solvent (the first liquid) can be quantitatively measured.

When the controller 4 (or the controller 4A) flows the second liquid into the first flow path 5, the controller 4 (or the controller 4A) may confirm presence or absence of the liquid using the optical sensor 3. In this case, it is also applicable that the controller 4 (or the controller 4A) drives the optical sensor 3 after driving the second pump 27 to flow the second liquid into the second flow path 6, and also drives the first pump 26 (or the first pump 26A and the fourth pump 58) to flow the first liquid into the first flow path 5 (and flow the liquid into the sixth flow path 52). The controller 4 (or the controller 4A) may drive the second pump 27 in a certain period time after driving the first pump 26 (or the first pump 26A and the fourth pump 58).

When the first flow path 5 and the second flow path 6 are connected to each other, the third flow path 22 may be connected to a connection part between the first flow path 5 and the second flow path 6. In this case, the controller 4 (or the controller 4A) may firstly flow the first liquid into the first flow path 5 after flowing the second liquid into the first flow path 5, and then flow the gas into the first flow path 5. Accordingly, the inflow of the first liquid into the second flow path 6 can be reduced.

It is also applicable to flow the gas into the first flow path 5 to divide the second liquid ranging from the second flow path 6 to the first flow path 5, and then flow the first liquid therein. In this case, the controller 4 (or the controller 4A) drives the third pump 28 after driving the second pump 27, and then drives the first pump 26 (or the first pump 26A and the fourth pump 58).

Described in the example described above is the example of supplying the third liquid from the sixth flow path 52 to the fourth flow path 34, however, the third liquid may be supplied from the second flow path 6 instead of the sixth flow path 52. In this case, the second liquid is the same as the third liquid. That is to say, there is no sixth flow path 52, and one end of the second flow path 6 is connected to the fourth pressing flow inlet 45 of the fourth flow path 34.

Described in the example described above is the example that the separation flow path device 33 includes the third substrate 35 and the fourth substrate 36, however, the sheet member 56 may also function as the fourth substrate 36 instead of the fourth substrate 36.

The invention claimed is:

1. A measurement apparatus, comprising:
   a flow path device including
      a first flow path in which first liquid including particles to be measured is flowed, and which includes a measurement region where the particles in the first liquid are measured with an optical sensor,
      a second flow path in which second liquid for comparison which does not include the particles is flowed, and which includes a comparison region where the second liquid is measured with the optical sensor,
      a calibration region for calibrating the optical sensor, and
      a non-reflection member disposed on a side of the flow path device that is opposite to the optical sensor, and that corresponds to the measurement region and the comparison region;
   an arm-like member in which the optical sensor including a light emitting element and a light receiving element is disposed in a first end, and in which a drive shaft is disposed in a second end; and
   a rotary drive actuator connected to the drive shaft and configured to rotationally drive the arm-like member in a predetermined range, wherein
   each of the measurement region, the comparison region, and the calibration region is disposed on a circumference along which the optical sensor moves in accordance with a rotary drive of the arm-like member.

2. The measurement apparatus according to claim 1, wherein
   the flow path device includes a non-reflection member disposed on the side that is opposite to the optical sensor or on a side of the flow path device that faces the optical sensor to correspond to the calibration region.

3. The measurement apparatus according to claim 1, wherein
   the flow path device includes a first flow outlet to which the first flow path is connected and through which the first liquid flows out in a range of the arm-like member, and
   the arm-like member includes a first liquid recovery container disposed to correspond to the first flow outlet and configured to recover the first liquid flowed out through the first flow outlet.

4. The measurement apparatus according to claim 1, wherein the rotary drive actuator is a pulse motor.

5. The measurement apparatus according to claim 1, wherein
   the light emitting element and the light receiving element are integrally disposed on one substrate in the optical sensor.

\* \* \* \* \*